(12) United States Patent
Takeda et al.

(10) Patent No.: US 10,999,044 B2
(45) Date of Patent: May 4, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/300,454

(22) PCT Filed: May 8, 2017

(86) PCT No.: PCT/JP2017/017353
§ 371 (c)(1),
(2) Date: Nov. 9, 2018

(87) PCT Pub. No.: WO2017/195721
PCT Pub. Date: Nov. 16, 2017

(65) Prior Publication Data
US 2019/0229878 A1 Jul. 25, 2019

(30) Foreign Application Priority Data
May 10, 2016 (JP) .............................. JP2016-094882

(51) Int. Cl.
*H04L 5/00* (2006.01)
*H04W 72/04* (2009.01)
(Continued)

(52) U.S. Cl.
CPC .......... *H04L 5/0082* (2013.01); *H04L 1/0038* (2013.01); *H04L 1/0047* (2013.01);
(Continued)

(58) Field of Classification Search
None
See application file for complete search history.

(56) References Cited

U.S. PATENT DOCUMENTS

2015/0256308 A1* 9/2015 Ma ...................... H04B 7/2615
370/330
2017/0374569 A1* 12/2017 Lee ...................... H04W 24/08
(Continued)

OTHER PUBLICATIONS

Provisional application, Park, U.S. Appl. No. 62/417,294, filed Nov. 3 2016 (Year: 2016).*

(Continued)

*Primary Examiner* — Jay L Vogel
(74) *Attorney, Agent, or Firm* — Osha Bergman Watanabe & Burton LLP

(57) ABSTRACT

The present invention is designed so that communication can be carried out properly even when shortened TTIs are used. A user terminal communicates using a first transmission time interval (TTI) and a second TTI which has a shorter TTI duration than the first TTI, and this user terminal has a receiving section that receives first downlink control information which is transmitted from a radio base station per first TTI, and second downlink control information which is transmitted in the second TTI, and a control section that controls simultaneous reception of first downlink data which is based on the first downlink control information, and second downlink data which is based on the second downlink control information, in a same carrier, based on a given condition.

2 Claims, 17 Drawing Sheets

(51) Int. Cl.
*H04W 72/02* (2009.01)
*H04L 1/00* (2006.01)

(52) U.S. Cl.
CPC .......... *H04L 5/0053* (2013.01); *H04L 5/0055* (2013.01); *H04L 5/0064* (2013.01); *H04L 5/0094* (2013.01); *H04W 72/02* (2013.01); *H04W 72/04* (2013.01); *H04W 72/042* (2013.01); *H04W 72/0446* (2013.01); *H04W 72/0453* (2013.01); *H04L 5/0007* (2013.01)

(56) References Cited

U.S. PATENT DOCUMENTS

| | | | | |
|---|---|---|---|---|
| 2018/0199341 | A1* | 7/2018 | Baldemair | H04L 27/264 |
| 2018/0234998 | A1* | 8/2018 | You | H04W 72/042 |
| 2019/0036758 | A1* | 1/2019 | Takeda | H04L 5/14 |
| 2019/0141679 | A1* | 5/2019 | He | H04L 5/0007 |
| 2019/0149384 | A1* | 5/2019 | Kim | H04L 27/2613 |
| 2019/0208505 | A1* | 7/2019 | Park | H04W 72/0446 |
| 2019/0223204 | A1* | 7/2019 | Kim | H04W 72/14 |

OTHER PUBLICATIONS

Provisional Application, You, U.S. Appl. No. 62/290,981, filed Feb. 4, 2016 (Year: 2016).*
He, U.S. Appl. No. 62/331,740, filed May 4, 2016 (Year: 2016).*
U.S. Appl. No. 62/387,401, Kim, filed Dec. 24, 2015 (Year: 2015).*
Extended European Search Report issued in the counterpart European Patent Application No. 17796082.0, dated Mar. 26, 2019 (6 pages).
ZTE; "Downlink control channels for shortened TTP"; 3GPP TSG RAN WG1 Meeting #84bis R1-162405; Busan, Korea, Apr. 11-15, 2016 (7 pages).
LG Electronics; "Discussion on specification impact for latency reduction techniques"; 3GPP TSG RAN WG1 Meeting #83 R1-156902; Anaheim, USA, Nov. 16-20, 2015 (6 pages).
International Search Report issued in PCT/JP2017/017353 dated Jul. 4, 2017 (1 page).
Witten Opinion of the International Searching Authority issued in PCT/JP2017/017353 dated Jul. 4, 2017 (3 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Office Action in counterpart European Patent Application No. 17 796 082.0 dated Feb. 15, 2021 (6 pages).
Nokia et al; "Details of Shorter TTI operation for Latency Reduction"; 3GPP TSG-RAN WG1 Meeting #84bis, R1-162788; Busan, South Korea; Apr. 11-15, 2016 (5 pages).

* cited by examiner

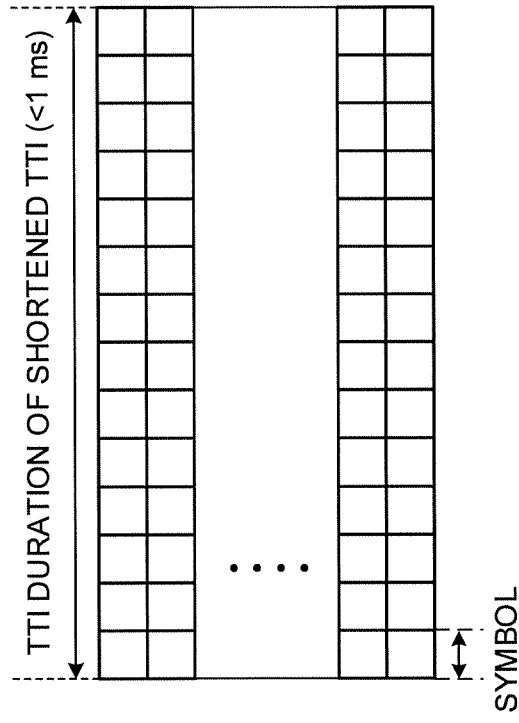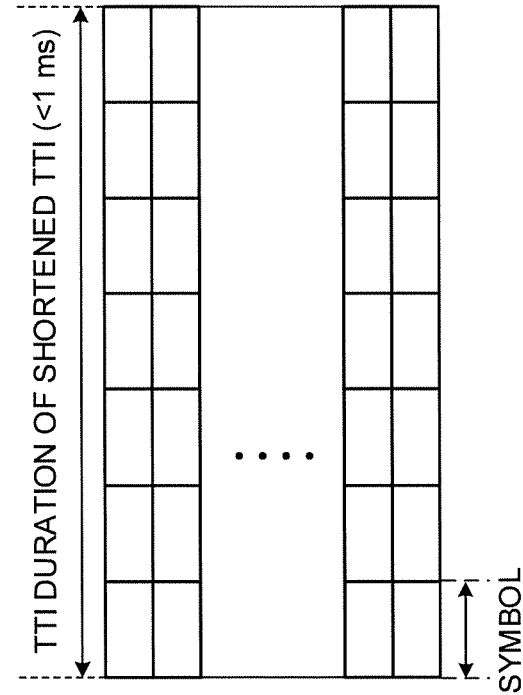
FIG. 3A
FIG. 3B

| HARQ-ACK feedback for (sPDSCH, PDSCH) | eNB's deduction |
|---|---|
| (ACK, ACK) | BOTH PDSCH AND sPDSCH ARE RECEIVED ON UE SIDE |
| (ACK, NACK) | AT LEAST sPDSCH IS RECEIVED ON UE SIDE |
| (NACK, ACK) | AT LEAST PDSCH IS RECEIVED ON UE SIDE |
| (NACK, NACK) | DATA CHANNEL RECEIVED ON UE SIDE IS UNIDENTIFIED |

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). The specifications of LTE-advanced (also referred to as LTE "Rel. 10," "Rel. 11" or "Rel. 12") have been drafted for the purpose of further broadbandization and higher speed beyond LTE (also referred to as "LTE Rel. 8"), and its successor systems (LTE Rel. 13 and later versions) are also under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed with different radio base stations are configured in a user terminal, is also introduced. Each cell group is comprised of at least one cell (CC). In DC, multiple CCs of different radio base stations are aggregated, so that DC is also referred to as "inter-eNB CA."

Also, in existing systems (LTE Rel. 8 to 12), frequency division duplex (FDD), in which downlink (DL) transmission and uplink (UL) transmission are made in different frequency bands, and time division duplex (TDD), in which DL transmission and UL transmission are switched over time and made in the same frequency band, are introduced.

In such existing systems, the transmission time intervals (TTIs) that are applied to DL transmission and UL transmission between radio base stations and user terminals are configured to 1 ms and controlled. A transmission time interval is also referred to as a "communication time interval," and a TTI in LTE systems (Rel. 8 to 12) is also referred to as a "subframe duration."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are anticipated to realize various radio communication services so as to fulfill varying requirements (for example, ultra-high speed, large capacity, ultra-low latency, etc.).

For example, 5G is under research to provide radio communication services referred to as "eMBB (enhanced Mobile Broad Band)," "IoT (Internet of Things)," "MTC (Machine Type Communication)," "M2M (Machine To Machine)," "URLLC (Ultra Reliable and Low Latency Communications)," and so on. Note that, depending on the communicating device, M2M may be referred to as "D2D (Device To Device)," "V2V (Vehicular To Vehicular)," and/and so on. To fulfill the requirements for the above-mentioned various types of communication, studies are going on to design a new communication access scheme (new RAT (Radio Access Technology)).

Reduction of communication delay (latency reduction) is under research in order to provide sufficient communication services in such future radio communication systems. For example, a study is in progress to make the transmission time interval (TTI) that serves as the minimum time unit in scheduling shorter than 1 ms in existing LTE systems (LTE Rel. 8 to 12), and communicate by using these TTIs (which may be referred to as, for example, "shortened TTIs").

However, although, in existing LTE systems, timing control in communication is carried out in units of subframes (1 ms), how to control transmission and receipt of signals when communication is carried out by introducing shortened TTIs is not decided yet. Therefore, a control method to enable proper communication when communication is carried out by introducing shortened TTIs is in demand.

The present invention has been made in view of the above points, and it is therefore an object of the present invention to provide a user terminal and a radio communication method whereby appropriate communication can be carried out even when shortened TTIs are used.

Solution to Problem

According to one aspect of the present invention, a user terminal communicates using a first transmission time interval (TTI) and a second TTI which has a shorter TTI duration than the first TTI, and this user terminal has a receiving section that receives first downlink control information which is transmitted from a radio base station per first TTI, and second downlink control information which is transmitted in the second TTI, and a control section that controls simultaneous reception of first downlink data which is based on the first downlink control information, and second downlink data which is based on the second downlink control information, in a same carrier, based on a given condition.

Advantageous Effects of Invention

According to the present invention, even when shortened TTIs are used, communication can be carried out properly.

BRIEF DESCRIPTION OF DRAWINGS

FIGS. 3A and 3B are diagrams to show examples of how shortened TTIs are configured;

DESCRIPTION OF EMBODIMENTS

Figure 1:
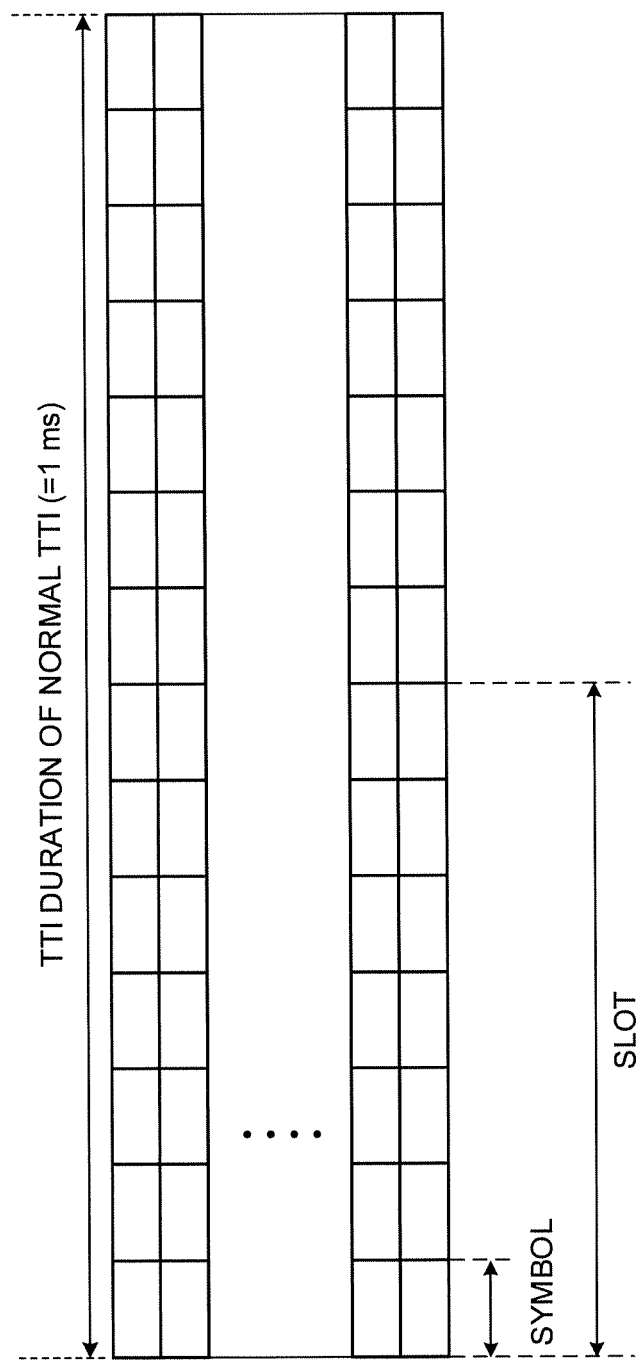
FIG. 1 is a diagram to show examples of transmission time intervals (TTIs) in existing LTE systems (Rel. 8 to 12)

FIG. 1 is a diagram to explain an example of transmission time intervals (TTIs) in existing systems (LTE Rel. 8 to 12). As shown in FIG. 1, a TTI in LTE Rel. 8 to 12 (hereinafter referred to as a "normal TTI") has a time duration of 1 ms. A normal TTI is also referred to as a "subframe," and is comprised of two time slots. A TTI is one channel-coded data packet (transport block) transmission time unit, and is the processing unit in scheduling, link adaptation, etc.

As shown in FIG. 1, when a normal cyclic prefix (CP) is used in the downlink (DL), a normal TTI includes 14 OFDM (Orthogonal Frequency Division Multiplexing) symbols (seven OFDM symbols per slot). Each OFDM symbol has a time duration (symbol duration) of 66.7 μs, and a normal CP of 4.76 μs is appended. Since the symbol duration and the subcarrier period are in reciprocal relationship to each other, the subcarrier period is 15 kHz when the symbol duration 66.7 μs.

Also, when normal a cyclic prefix (CP) is used in the uplink (UL), a normal TTI is configured to include 14 SC-FDMA (Single Carrier Frequency Division Multiple Access) symbols (seven SC-FDMA symbols per slot). Each SC-FDMA symbol has a time duration (symbol duration) of 66.7 μs, and a normal CP of 4.76 μs is appended. Since the symbol duration and the subcarrier period are in reciprocal relationship to each other, the subcarrier period is 15 kHz when the symbol duration 66.7 μs.

Note that, when extended CPs are used, a normal TTI may include 12 OFDM symbols (or 12 SC-FDMA symbols). In this case, each OFDM symbol (or each SC-FDMA symbol) has a time duration of 66.7 μs, and an extended CP of 16.67 μs is appended.

On the other hand, in future radio communication systems such as Rel. 13 and later LTE and 5G, a radio interface that is suitable for high frequency bands such as several tens of GHz and so on and a radio interface that minimizes delay for IoT (Internet of Things), MTC (Machine Type Communication), M2M (Machine To Machine), D2D (Device To Device) and V2V (Vehicular To Vehicular) services are in demand.

Figure 2:
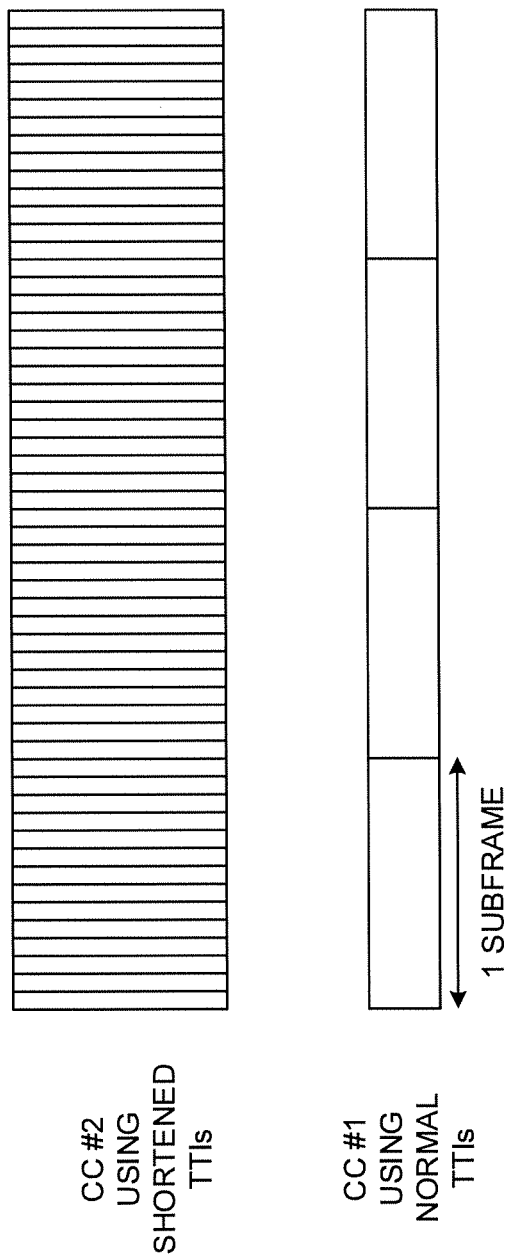
FIG. 2 is a diagram to explain a normal TTI and a shortened TTI.

So, in future communication systems, communication may be performed using shortened TTIs, which are TTIs shorter than 1 ms (see FIG. 2). FIG. 2 shows a cell (CC #1) using normal TTIs (1 ms) and a cell (CC #2) using shortened TTIs. Also, when shortened TTIs are used, it may be possible to change the subcarrier spacing (for example, expand the subcarrier spacing) from that of subcarriers with normal TTIs.

When TTIs of a shorter time duration than normal TTIs (hereinafter referred to as "shortened TTIs") are used, the time margin for processing in user terminals and radio base stations (for example, coding, decoding, etc.) increases, so that the processing latency can be reduced. Also, when shortened TTIs are used, it is possible to increase the number of user terminals that can be accommodated per unit time (for example, 1 ms). Below, the configuration of shortened TTIs and so on will be explained.

(Example of Configuration of Shortened TTI)

A configuration example of shortened TTIs will be described with reference to FIG. 3. As shown in FIGS. 3A and 3B, shortened TTIs have a time duration (TTI duration) shorter than 1 ms. A shortened TTI may be one TTI duration or multiple TTI durations, whose multiples become 0.5 ms, 0.25 ms, 0.2 ms, 0.1 ms and so on. Alternatively, when normal CPs are used, given that a normal TTI contains fourteen symbols, one TTI duration or multiple TTI durations, whose multiples are integral multiples of 1/14 ms, such as 7/14 ms, 4/14 ms, 3/14 ms, 2/14 ms, and 1/14 ms, may be used. Also, when extended CPs are used, given that a normal TTI contains twelve symbols, one TTI duration or multiple TTI durations, whose multiples are integral multiples of 1/12 ms, such as 6/12 ms, 4/12 ms, 3/12 ms, 2/12 ms and 1/12 ms, may be used.

Also in shortened TTIs, as in conventional LTE, whether to use a normal CP or use an extended CP can be configured by way of higher layer signaling such as broadcast information and RRC signaling. By this means, it is possible to introduce shortened TTIs, while maintaining compatibility (synchronization) with 1-ms normal TTIs.

Note that, although FIGS. 3A and 3B illustrate example cases of using normal CPs, the present invention is not limited to these. Shortened TTIs have only to have a shorter time duration than normal TTIs, and the number of symbols in a shortened TTI, the duration of symbols, the duration of CPs and suchlike configurations are not critical. Also, although examples will be described below in which OFDM symbols are used in the DL and SC-FDMA symbols are used in the UL, the present invention is not limited to these.

FIG. 3A is a diagram to show a first configuration example of shortened TTIs. As shown in FIG. 3A, in the first configuration example, a shortened TTI is comprised of 14 OFDM symbols (or SC-FDMA symbols), which is equal in number to a normal TTI, and each OFDM symbol (each SC-FDMA symbol) has a symbol duration shorter than the symbol duration (=66.7 μs) of the normal TTI.

As shown in FIG. 3A, when maintaining the number of symbols in a normal TTI and shortening the symbol duration, the physical layer signal configuration (arrangement of REs, etc.) of normal TTIs can be reused. In addition, when maintaining the number of symbols in a normal TTI, it is possible to include, in a shortened TTI, the same amount of information (the same amount of bits) as in the normal TTI. Meanwhile, given that the time duration of symbols in shortened TTIs is different from that of symbols in normal TTIs, it is difficult to frequency-multiplex the shortened TTI-signal shown in FIG. 3A with a normal-TTI signal, in the same system band (or cell, CC, etc.).

Also, since the symbol duration and the subcarrier period are each the reciprocal of the other, as shown in FIG. 3A, when shortening the symbol duration, the subcarrier period is wider than the 15-kHz subcarrier period of normal TTIs. When the subcarrier spacing becomes wider, it is possible to effectively prevent the inter-channel interference that is caused by the Doppler shift when the user terminal moves, and the deterioration of communication quality due to phase noise in the user terminal's receiver. In particular, in high frequency bands such as bands of several tens of GHz, the deterioration of communication quality can be effectively prevented by expanding the subcarrier spacing.

FIG. 3B is a diagram to show a second configuration example of a shortened TTI. As shown in FIG. 3B, according to the second configuration example, a shortened TTI is comprised of a smaller number of OFDM symbols (or SC-FDMA symbols) than a normal TTI, and each OFDM symbol (each SC-FDMA symbol) has the same symbol duration (=66.7 µs) as a normal TTI. In this case, the shortened TTI can be formed with symbol units of a normal TTI (that is, can be formed with a reduced number of symbols). For example, a shortened TTI can be formed by using part of the fourteen symbols included in one subframe. In FIG. 3B, a shortened TTI is comprised of seven OFDM symbols (SC-FDMA symbols), which is half of a normal TTI.

As shown in FIG. 3B, when reducing the symbol duration and reducing number of symbols, the amount of information (the amount of bits) included in a shortened TTI can be reduced lower than in a normal TTI. Therefore, the user terminal can perform the receiving process (for example, demodulation, decoding, etc.) of the information included in a shortened TTI in a shorter time than a normal TTI, and therefore the processing latency can be shortened. Moreover, by setting the symbol duration to be the same as in existing systems, it is possible to frequency-multiplex shortened TTI signals and normal TTI signals in the same system band (or carrier, cell, CC, etc.), so that compatibility with normal TTI can be maintained.

Now, in order to use frequencies effectively in 5G radio communication, it may be possible to run multiple services with different numerologies (for example, with different TTI durations applied) in the same carrier. For example, it may be possible to run a new RAT carrier (frequency, cell, CC, etc.) by accommodating user terminals (for example, user terminals that use MBB, IoT, URLLC, etc.) that communicate based on different numerologies, within the same time frame.

In this case, how to transmit/receive signals using normal TTIs (subframes) and transmit/receive signals using shortened TTIs in the same carrier (cell, CC, etc.) is the problem. Therefore, the present inventors have focused on a scheduling control method using two types of downlink control information (DCI) (see FIG. 4).

For example, the user terminal receives the DL scheduling control information in downlink control information that is transmitted in units of normal TTIs (subframes) and in downlink control information that is transmitted in units of shortened TTIs. Note that the downlink control information transmitted in units of normal TTIs may be referred to as "first DCI," "slow DCI," or "long-term DCI." Also, downlink control information transmitted in shortened TTI units may be referred to as "sDCI," "second DCI," "fast DCI," "short-term DCI," or "shortened DCI." The downlink control information that is transmitted in units of normal TTIs may be configured to use downlink control information of existing LTE systems (Rel. 12 or earlier versions) (or use existing DCI's allocation field, transmission timing, and so on).

Also, the downlink control information that is transmitted in normal TTIs can be transmitted using existing downlink control channels (PDCCH and/or EPDCCH). Also, the downlink control information that is transmitted in shortened TTIs can be transmitted using a shortened downlink control channel (sPDCCH).

Figure 4:
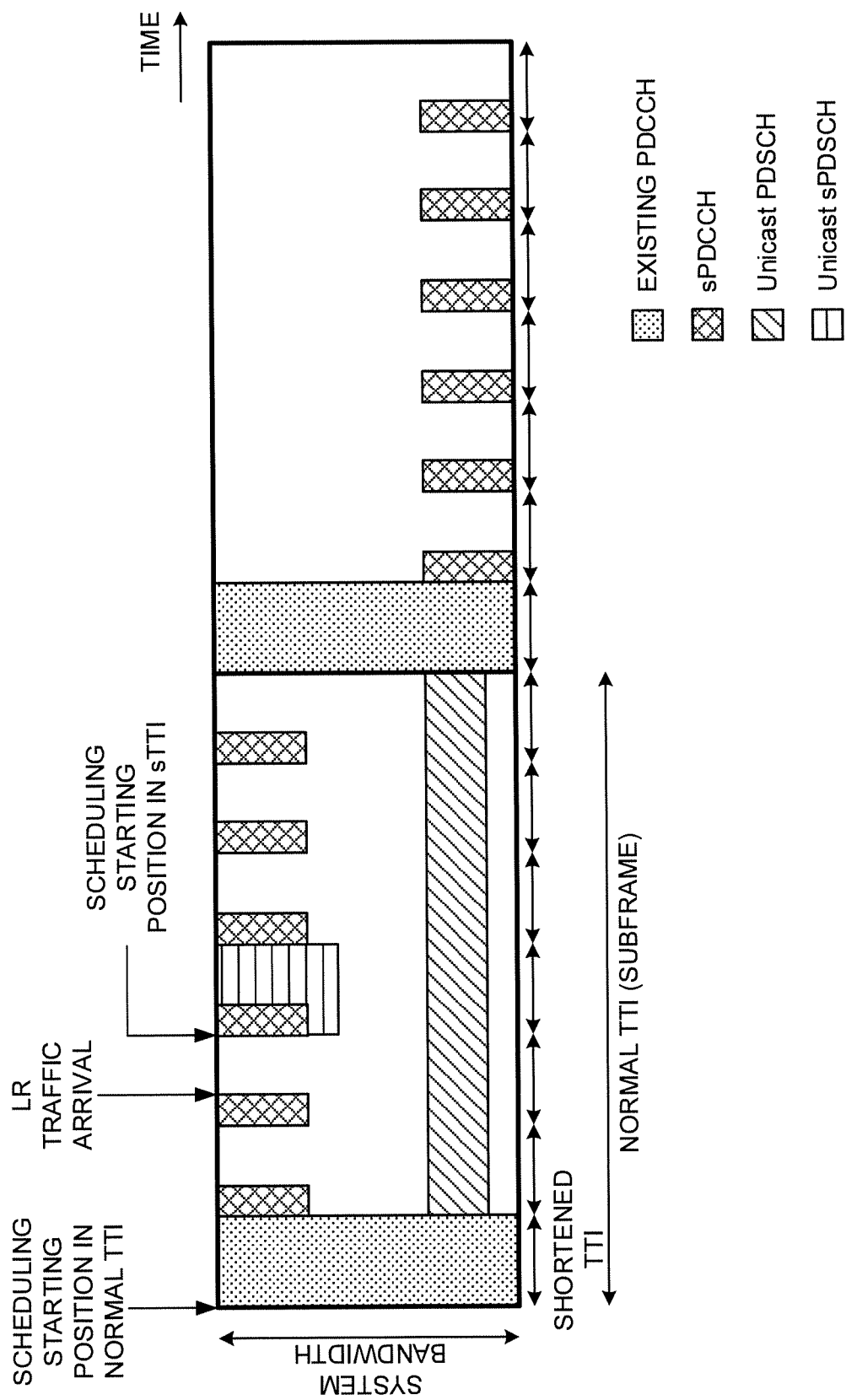
FIG. 4 is a diagram to show an example of DL scheduling using two types of DCIs.

FIG. 4 shows the case of configuring seven shortened TTIs (sTTIs) in one subframe. In addition, FIG. 4 shows the case where an sPDCCH is configured in each sTTI. In the case shown in FIG. 4, no sPDCCH is configured in the sTTI located at the head of the subframe, but an sPDCCH may as well be configured in this sTTI.

Also, the radio base station can schedule the user terminal-specific data channel (unicast PDSCH) on a subframe basis using the existing downlink control channel (for example, PDCCH). In addition, the radio base station can schedule user terminal-specific data channels (unicast sPDSCHs) in units of sTTIs, using a downlink control channel for shortened TTIs (for example, sPDCCH).

Now, in future communication systems, it is desirable to achieve reduction in communication latency (latency reduction). In order to meet this demand, when, for example, data that needs to be transmitted in a hurry (also referred to as "LR traffic," for example) is generated, depending on the timing the data is generated, even in the middle of a subframe, transmitting this data is effective to reduce the latency.

For example, when data that requires reduced latency (for example, PDSCH) is generated in the middle of a subframe, the radio base station schedules the data using the sPDCCH transmitted in sTTIs (see FIG. 4). By this means, it is possible to transmit the urgent data in units of sTTIs, without waiting for the end of the subframe, so that the latency in data transmission can be reduced.

Meanwhile, if the radio base station schedules data (for example, existing PDSCH) in the existing PDCCH throughout this subframe, simultaneous transmission of sPDSCH and PDSCH occurs in the subframe. In FIG. 4, PDSCH and sPDSCH are allocated to overlap each other in four sTTI periods in the subframe. In this case, how to control the receiving process at the user terminal and/or the transmission process (resource allocation, etc.) at the radio base station is the problem.

The present inventors have focused on the possibility that PDSCH and sPDSCH are transmitted simultaneously (allocated simultaneously) in the same carrier and the same subframe, and found out the method of controlling simultaneous transmission of PDSCH and sPDSCH based on user terminal capabilities and/or predetermined conditions. To be more specific, as one aspect of the present invention, the present inventors have come up with the idea of controlling simultaneous receipt of downlink data (PDSCH) based on downlink control information (PDCCH) in normal TTIs and downlink data (sPDSCH) based on downlink control information (sPDCCH) in shortened TTIs, in the same carrier, based on user terminal capabilities and/or predetermined conditions.

Alternatively, as another aspect of the present invention, the present inventors have come up with the idea of controlling simultaneous transmission of uplink data (PUSCH) based on downlink control information (PDCCH) in normal TTIs and uplink data (sPUSCH) based on downlink control information (sPDCCH) in shortened TTIs, in the same carrier and the same subframe, based on user terminal capabilities and/or predetermined conditions.

Now, the present embodiment will be described below detail. Although, in the following description, a TTI having a shorter TTI duration than 1 ms will be referred to as a "shortened TTI," this may be also referred to as a "short TTI," a "shortened subframe," or a "short subframe." Also, a 1-ms TTI will be referred to as a "normal TTI," but this may be also referred to as a "long TTI," a "normal subframe," or a "long subframe." Also, the shortened TTI of the present embodiment can adopt the configuration shown in FIG. 1 to FIG. 3 above.

Also, in the following description, simultaneous transmission of downlink data (PDSCH)/uplink data (PUSCH) scheduled by a downlink control channel (PDCCH and/or EPDCCH) transmitted in units of existing TTIs (subframes) and sPDSCH/sPUSCH scheduled by sPDCCH transmitted in units of sTTIs, in the same carrier (or cell, CC, etc.), will be exemplified. However, the signals (or channels) to which the present embodiment can be applied is not limited to data (or data channels). The present embodiment can be equally applied to transmission of signals, transmission of which is controlled in normal TTIs, and signals, transmission of which is controlled in in sTTIs.

Also, the present embodiment can be applied to user terminals that can communicate using at least different TTI durations. In the following description, an LTE system will be shown as an example, but the present embodiment is not limited to this, and any system can be applied as long as it uses shortened TTIs. In addition, a plurality of embodiments described below may be implemented individually or in combination as appropriate.

(First Aspect)

In accordance with a first aspect of the present invention, an example of user operation in the event downlink data (unicast PDSCH) for normal TTIs and downlink data (unicast sPDSCH) for shortened TTIs are scheduled simultaneously in a predetermined subframe of the same carrier will be described (or cell, CC, etc.). In the following description, downlink data and a downlink control channel transmitted in units of normal TTIs (subframes) will be referred to as "PDSCH" and "PDCCH," respectively, and downlink data and a downlink control channel transmitted in units of shortened TTIs (sTTIs) will be referred to as "sPDSCH" and "sPDCCH," respectively.

For user terminals with a user capability for simultaneously receiving PDSCH for normal TTIs and sPDSCH for shortened TTIs and/or user terminals that may or may not have this user capability, the radio base station schedules PDSCH and sPDSCH simultaneously. For example, if urgent data (for example, latency reduction traffic) is generated in the middle of a subframe in which PDSCH for normal TTIs is scheduled, the radio base station schedules sPDSCH in a predetermined shortened TTI included in the subframe.

In this case, the user terminal performs the receiving process (for example, decoding process) for both PDSCH and sPDSCH when a predetermined condition (condition X) is fulfilled, and, performs the receiving process for only one of PDSCH and sPDSCH if conditions X is not fulfilled (first method). Alternatively, the user terminal may always perform the receiving process of only one of PDSCH and sPDSCH based on a predetermined condition (second method). Alternatively, the user terminal autonomously determines whether to perform the receiving process for both PDSCH and sPDSCH or perform the receiving process for only one of these (third method).

<First Method>

Figure 5:
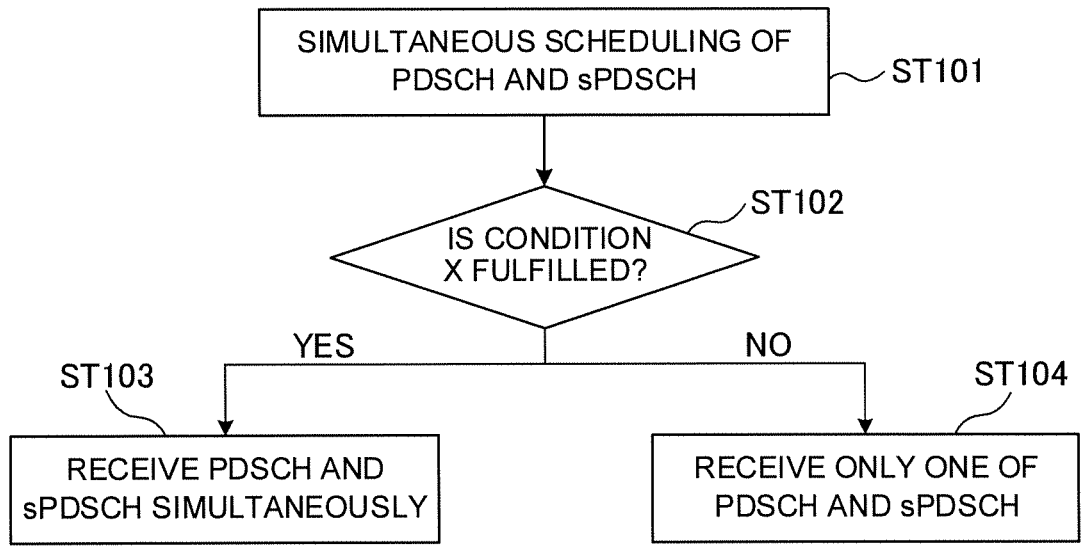
FIG. 5 is a diagram to show an example of the operation of a user terminal when PDSCH and sPDSCH are scheduled at the same time.

FIG. 5 is a diagram to show an example of user operation in the event of applying the first method. When PDSCH and sPDSCH are scheduled at the same time (ST 101), the user terminal determines whether or not a predetermined condition (condition X) is fulfilled (ST 102). The user terminal can judge the allocation of PDSCH and sPDSCH by performing the receiving process (for example, blind decoding) for PDCCH and sPDCCH.

Figures 6A, 6B:
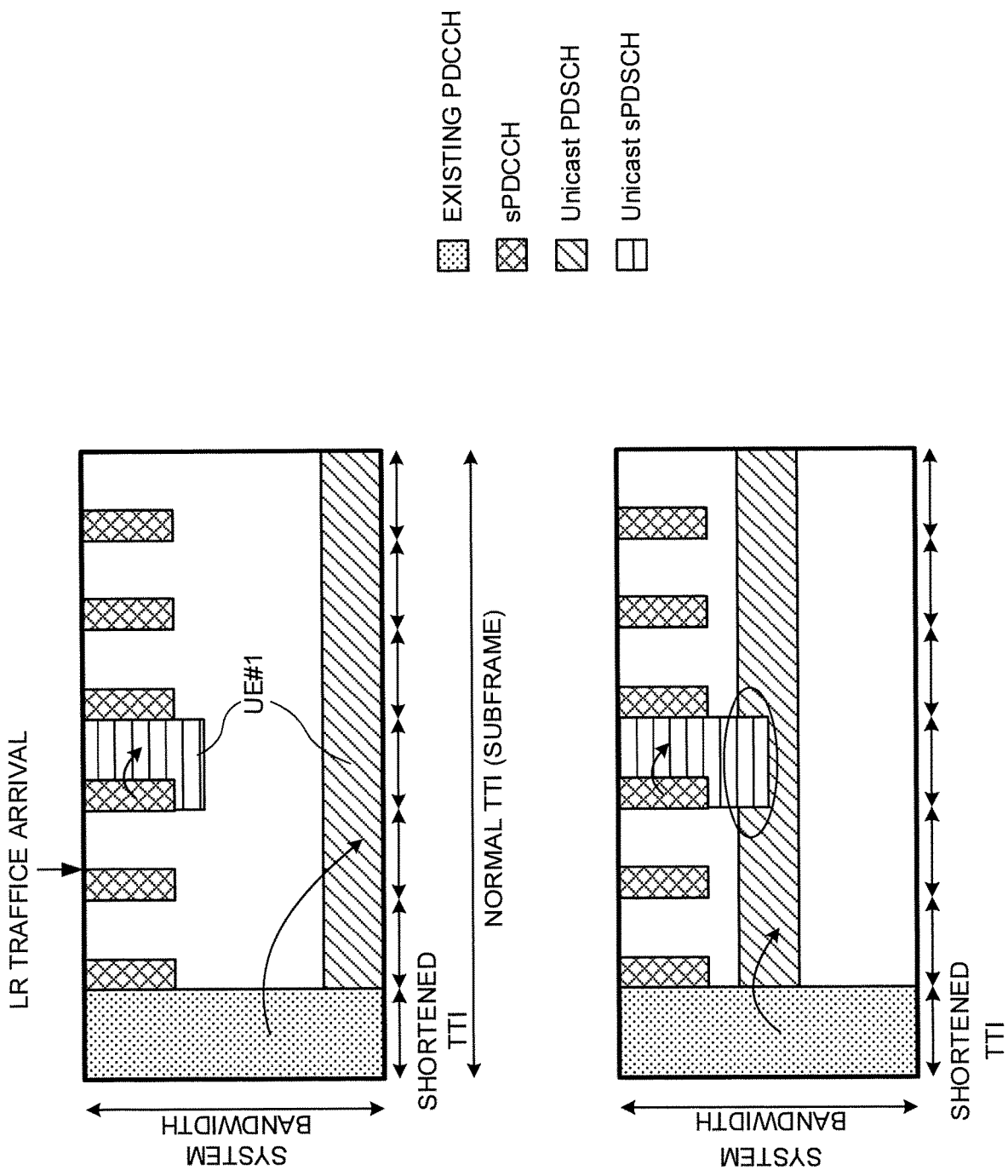
FIGS. 6A and 6B are diagrams to show examples of allocation of PDSCH and sPDSCH.

If condition X is fulfilled, the user terminal (UE #1) performs the receiving process (simultaneous receipt) for PDSCH and sPDSCH (ST 103, see FIG. 6A). On the other hand, if condition X is not fulfilled, the user terminal performs the receiving process for one of PDSCH and sPDSCH based on a predetermined rule (ST 104). In this case, the user terminal may be controlled to receive only one of PDSCH and sPDSCH at least during an overlapping period (for example, an sTTI period where sPDSCH is allocated).

The predetermined condition (condition X) to be considered in ST 102 may be at least one of the type (or use) of sPDSCH, the type (or use) of sPDCCH, the transport block size (TBS) and/or the modulation and coding scheme (MCS) of PDSCH, and the total of the TBS of PDSCH and the TBS of sPDSCH. Alternatively, part or all of these conditions may be combined and configured. Alternatively, other conditions may be configured.

For example, when this PDSCH is a PDSCH to which semi-persistent scheduling (SPS (Semi Persistent Scheduling)) is applied, the user terminal judges that condition X is fulfilled, and receives PDSCH and sPDSCH simultaneously. SPS indicates an operation, in which the radio base station apparatus allocates PDSCH to the user terminal in a predetermined cycle, on a fixed basis, from the subframe (allocation starting time), in which downlink scheduling information is transmitted to the user terminal via PDCCH, as the starting point. SPS is used for sound/voice data (VoIP), etc.

When SPS is applied to PDSCH, given that the period and the resource of PDSCH are fixed, the processing burden on decoding is not heavy compared to PDSCH that is not subject to SPS, in which scheduling is made dynamically on a per subframe basis. Therefore, by using configurations for receiving PDSCH and sPDSCH simultaneously, SPS communication of sound/voice and others, and urgent traffic, can be controlled at the same time, while minimizing an increase in processing burden.

Also, when PDCCH (and/or PDSCH) is used in random access procedures, the user terminal can judge that condition X is fulfilled, and receive PDSCH and sPDSCH simultaneously. For example, if PDCCH transmitted in a normal TTI is PDCCH to schedule message 0 or message 2 in random access procedures, the user terminal receives both PDSCH scheduled by this PDCCH and sPDSCH scheduled by sPDCCH in the shortened TTI.

The random access procedures refers to the operation used when initial access is gained, synchronization is established, communication is resumed and so on, and signals related to random access procedures are signals that are important to the user terminal compared to normally received DL data. Therefore, when PDCCH (and/or PDSCH) is used in random access procedures, it is preferable to judge that condition X is fulfilled, and receive PDSCH and sPDSCH simultaneously. By this means, deterioration of communication quality can be reduced, and latency can be reduced.

Also, when the TBS of PDSCH ($TBS_{PDSCH}$) is less than or equal to a predetermined threshold (for example, the first threshold), and/or when the MCS of PDSCH ($MCS_{PDSCH}$) is less than or equal to a predetermined threshold (for example, a second threshold), the user terminal can judge that condition X is fulfilled and receive PDSCH and sPDSCH simultaneously.

By receiving PDSCH and sPDSCH simultaneously based on the TBS of PDSCH (when $TBS_{PDSCH}$ is less than or equal to a predetermined threshold), the user terminal can control simultaneous receipt of PDSCH and sPDSCH not to exceed the number of received bits to manage, control and store PDSCH (also referred to as "soft buffer size," etc.) during simultaneous receipt. Alternatively, by receiving PDSCH and sPDSCH simultaneously based on the MCS of PDSCH (when $MCS_{PDSCH}$ is equal to or less than a predetermined threshold), the user terminal can control simultaneous receipt of PDSCH and sPDSCH not to exceed the number of received bits to manage, control, and store PDSCH (also referred to as "soft buffer size," etc.) during simultaneous receipt.

Alternatively, the user terminal may judge that condition X is fulfilled, if the sum of the TBS of PDSCH ($TBS_{PDSCH}$) and the TBS of sPDSCH ($TBS_{sPDSCH}$) is less than or equal to a predetermined threshold (for example, a third threshold). In this way, by taking into account the TBS of sPDSCH in addition to the TBS of PDSCH, simultaneous receipt of PDSCH and sPDSCH can be controlled not to exceed the number of received bits to manage, control and store both PDSCH and sPDSCH (also referred to as "soft buffer size," etc.).

Note that the user terminal can obtain parameters (scheduling information related to MCS, RB allocation, etc.) for judging whether or not condition X is fulfilled from PDCCH and/or sPDCCH. That is, the user terminal performs the receiving process (for example, blind decoding) for PDCCH and sPDCCH in each subframe, and receives PDSCH and sPDSCH simultaneously when judging that condition X is fulfilled. On the other hand, when the user terminal judges that condition X is not fulfilled, the user terminal performs the receiving process for one of PDSCH and sPDSCH.

Note that the user terminal may be configured to perform the receiving process (for example, blind decoding) of the sPDCCH in each subframe, or only in predetermined subframes that are defined in advance. In TDD (frame structure type 2), the receiving process for sPDCCH may be performed only in downlink subframes, or, in comparison to downlink subframes, the sPDCCH receiving process may be performed also in special subframes, which include downlink symbols, a guard period and uplink symbols in the same subframe. When the receiving process for sPDCCH is performed only in downlink subframes, the processing load of the terminal can be reduced, and the battery consumption can be lowered. When the receiving process for sPDCCH is performed in special subframes, too, more opportunities can be provided to transmit and receive sPDSCH, so that improved latency reduction effect can be achieved. The predetermined subframes may be fixedly defined in the specification, may be configured to be reported from the radio base station to the user terminal via higher layer signaling and/or PDCCH.

Also, when the user terminal receives PDSCH and sPDSCH simultaneously (for example, when condition X is fulfilled), it is preferable to configure so that the field where PDSCH is allocated (the resource allocated) and the field where sPDSCH is allocated do not overlap.

For example, assume that the radio base station allocates resources for PDSCH and resources for sPDSCH to a certain user terminal (for example, UE #1) in an overlapping manner (see FIG. 6B). In this case, when traffic to demand reduced latency occurs in the middle of a subframe, the radio base station allocates sPDSCH to resources overlapping the PDSCH allocated to the user terminal. As a result, the user terminal may not be able to receive DL data properly in the part where PDSCH and sPDSCH overlap.

Therefore, when the user terminal receives PDSCH and sPDSCH simultaneously (for example, when condition X is fulfilled), the radio base station can configure PDSCH resource and sPDSCH resource not to overlap each other (see FIG. 6A).

<Second Method>

Figure 7A:
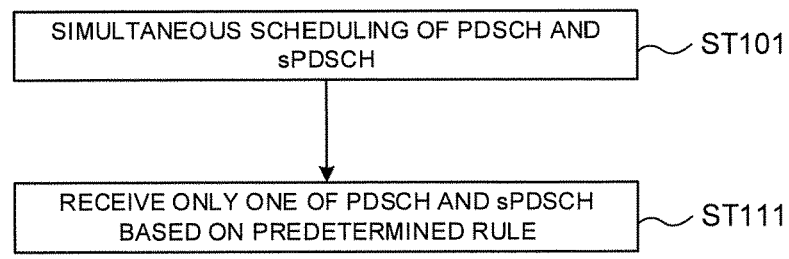
FIGS. 7A to 7C are diagrams to show other examples of user terminal operation when PDSCH and sPDSCH are scheduled at the same time.

FIG. 7A is a diagram to show an example of user operation in the event of applying a second method. When PDSCH and sPDSCH are scheduled at the same time (ST 101), the user terminal performs the receiving process of one of PDSCH and sPDSCH based on a predetermined rule (ST 111). Note that the second method can also be applied to user terminal operations when a predetermined condition (condition X) is not fulfilled in the first method (for example, ST 104 in FIG. 5).

Figure 7B:
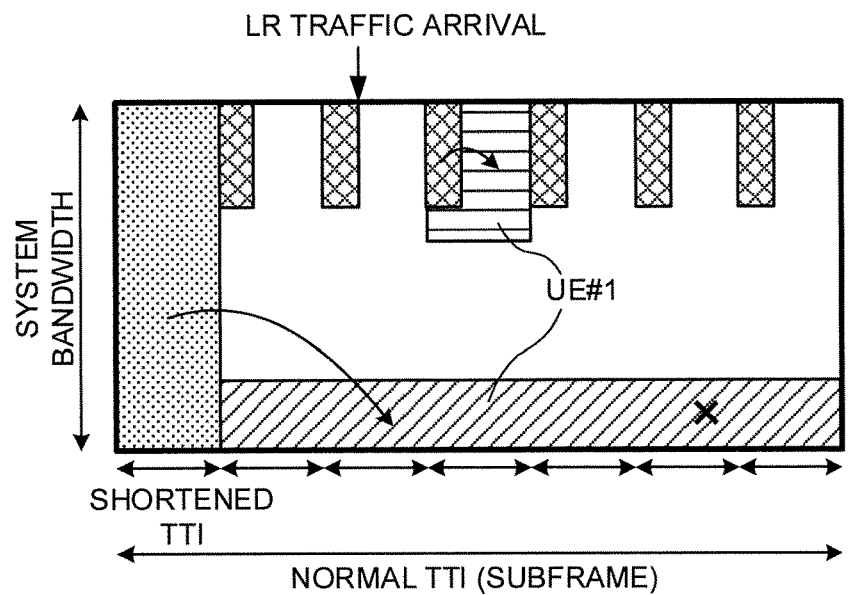

When PDSCH and sPDSCH are scheduled simultaneously in the same subframe, the user terminal can control so as not to perform (skip or interrupt) the receiving process for one of PDSCH and sPDSCH, at all times (see FIG. 7B). In the case shown in FIG. 7B, when PDSCH and sPDSCH are scheduled simultaneously in the same subframe, the user terminal always decodes sPDSCH, without decoding PDSCH.

Figure 7C:
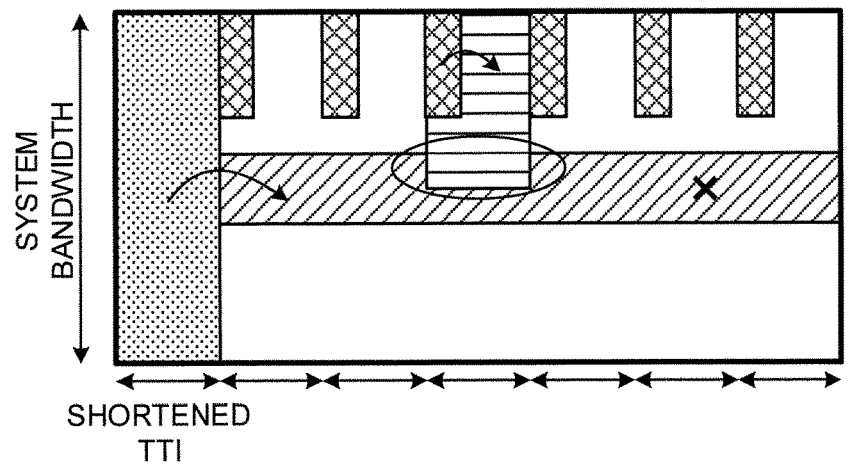

Since data allocated in shortened TTIs (sPDSCH) is often data that demands reduced latency, by prioritizing the receiving process for sPDSCH, the latency required by the system can be reduced. Furthermore, when the user terminal receives only one of PDSCH and sPDSCH, the resource for PDSCH and the resource for sPDSCH may be configured to overlap each other (see FIG. 7C). This allows the radio base station to configure resource allocation for PDSCH and sPDSCH in a flexible way.

Also, the user terminal may prioritize receipt of PDSCH over sPDSCH depending on the type (or use) of PDSCH and/or PDCCH. For example, if PDSCH (and/or PDCCH) is used for a random access procedure, the user terminal performs control so that PDSCH is decoded and sPDSCH is not received (skipped or suspended).

In this way, by performing control so that the receiving process is performed for one of PDSCH and sPDSCH depending on the type (or use) of signals and so on, deterioration of communication quality and/or latency can be reduced. Also, by allowing the radio base station to allocate overlapping resources to PDSCH and sPDSCH, PDSCH and sPDSCH resources can be allocated flexibly.

<Third Method>

Figures 8A, 8B:
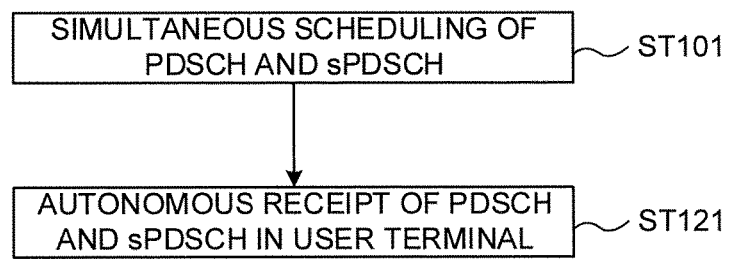
FIGS. 8A and 8B are diagrams to show other examples of user terminal operation when PDSCH and sPDSCH are scheduled at the same time.

FIG. 8A is a diagram to show an example of user operation in the event of applying a third method. When PDSCH and sPDSCH are scheduled at the same time (ST 101), whether the receiving process is performed for both PDSCH and sPDSCH or performed for only one of PDSCH and sPDSCH is autonomously determined on the user terminal side (ST 121). That is, the user terminal side may decide to receive PDSCH and sPDSCH simultaneously, or decide to perform the receiving process for either one of PDSCH or sPDSCH.

When the user terminal autonomously decides to receive PDSCH and sPDSCH, the radio base station has no way of knowing how the user terminal has reached the decision. In other words, the radio base station and the user terminal are in a state where they do not share a common understanding of the method of receiving PDSCH and sPDSCH. Therefore, even when the receiving process is not performed for one or both of PDSCH and/or sPDSCH, if the user terminal judges that both PDSCH and sPDSCH are scheduled, based on the results of the receiving process for PDCCH, which schedules both, and sPDCCH, the user terminal can feed back a delivery acknowledgment signal (HARQ-ACK, ACK/NACK, etc.).

In this case, the radio base station can identify the receiving method that has been selected by the user terminal, based on the delivery acknowledgment signals (HARQ-ACK, ACK/NACK, etc.) fed back from the user terminal in response to PDSCH and sPDSCH (see FIG. 8B).

For example, if the delivery acknowledgment signals returned in response to sPDSCH and PDSCH are both ACKs, the radio base station judges that the user terminal has performed the receiving process for both sPDSCH and PDSCH.

If the delivery acknowledgment signal in response to sPDSCH is an ACK and the delivery acknowledgment signal in response to PDSCH is a NACK, the radio base station judges that the user terminal has performed the receiving process at least for sPDSCH. Meanwhile, the radio base station cannot judge whether the user terminal has failed to receive PDSCH, or has not performed (skipped or suspended) the receiving process for PDSCH. In this case, for safety, the radio base station may retransmit PDSCH (for example, as RV 0) to the user terminal. Thus, even if the user terminal has failed to receive PDSCH, the user terminal can receive retransmitted data.

If the delivery acknowledgment signal in response to sPDSCH is a NACK and the delivery acknowledgment signal in response to PDSCH is an ACK, the radio base station judges that the user terminal has performed the receiving process at least for PDSCH. Meanwhile, the radio base station cannot judge whether the user terminal has failed to receive sPDSCH, or has not performed (skipped or suspended) the receiving process for sPDSCH. In this case, for safety, the radio base station may retransmit sPDSCH (for example, as RV 0) to the user terminal.

If the delivery acknowledgment signals in response to sPDSCH and PDSCH are both NACK, the radio base station cannot judge whether the user terminal has failed to receive sPDSCH and PDSCH, or has not performed (skipped or suspended) the receiving process. In this case, for safety, the radio base station may retransmit sPDSCH and PDSCH (for example, as RV 0) to the user terminal.

Figure 9A:
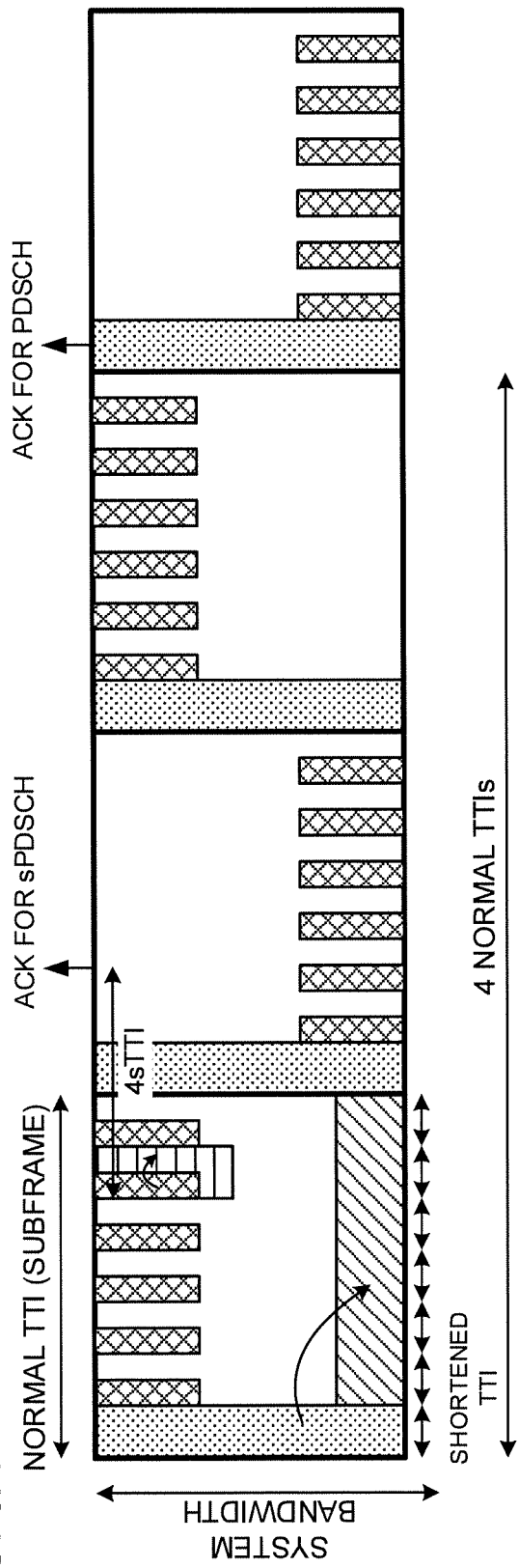
FIGS. 9A and 9B are diagrams to show examples of retransmission control when PDSCH and sPDSCH are scheduled at the same time.

In addition, the user terminal can feed back the delivery acknowledgment signal in response to the sPDSCH and the delivery acknowledgment signal in response to PDSCH at different timings. For example, the user terminal feeds back the delivery acknowledgment signal in response to sPDSCH after the first predetermined period (for example, four sTTIs) or more from receipt of sPDSCH. Also, the user terminal can feed back the delivery acknowledgment signal in response to PDSCH after a second predetermined period (for example, four subframes) or more from receipt of sPDSCH (see FIG. 9A).

Figure 9B:
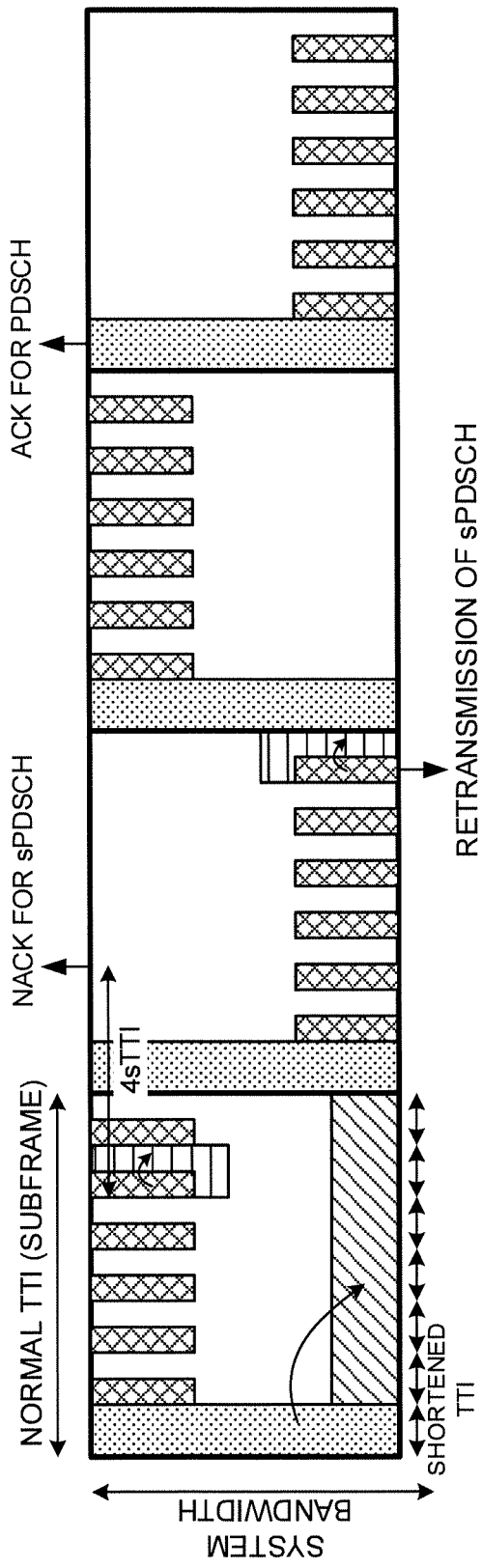

Also, based on delivery acknowledgment signals fed back from the user terminal, the radio base station can retransmit sPDSCH and PDSCH at different timings. For example, the radio base station retransmits sPDSCH after a third predetermined period (for example, four sTTIs) or more from receipt of the delivery acknowledgment signal (for example, a NACK) in response to sPDSCH (see FIG. 9B). Also, the radio base station retransmits the PDSCH after a fourth predetermined period (for example, four subframes) for more from receipt of the delivery acknowledgment signal (for example, a NACK) in response to PDSCH.

Also, according to the third method, considering the possibility that the user terminal receives PDSCH and sPDSCH simultaneously, the radio base station may configure the field for allocating PDSCH and the field for allocating sPDSCH not to overlap each other.

(Second Aspect)

In accordance with a second aspect of the present invention, a case will be described here where the user terminal reports user capability information (UE capability) regarding the user terminal's ability to receive PDSCH and sPDSCH simultaneously, in the same carrier and in the same subframe, to the radio base station.

The radio base station controls scheduling of PDSCH and sPDSCH based on user capability information reported from the user terminal. If the user terminal supports the capability for receiving PDSCH and sPDSCH simultaneously, the radio base station can allocate PDSCH and sPDSCH to the user terminal in the same subframe, in the same carrier. In this case, it is preferable that the radio base station allocates PDSCH resource and sPDSCH resource not to overlap each other (see FIG. 6A).

If the user terminal does not support capability for receiving PDSCH and sPDSCH simultaneously, the radio base station can exert control so that PDSCH and sPDSCH are not allocated to the user terminal in the same subframe, in the same carrier.

Alternatively, when urgent data appears in the middle of a subframe scheduled for PDSCH, the radio base station may transmit sPDSCH instead of PDSCH. In this case, the radio base station may allow PDSCH resource and sPDSCH resource to overlap each other, and control their allocation accordingly (see FIG. 7C). In addition, the radio base station may exert retransmission control and so on based on the assumption that the user terminal preferentially receives sPDSCH.

Also, if user capability information related to the ability to receive PDSCH and sPDSCH simultaneously is not reported from the user terminal, the radio base station can control scheduling of PDSCH and sPDSCH, on the assumption that the user terminal supports the capability for simultaneous receipt. Alternatively, the radio base station may control scheduling, assuming that the user terminal does not support the capability for simultaneous receipt. In any case, the user terminal, with or without capability for simultaneous receipt, does not have to report its user capability information, so that signaling overhead can be reduced.

(Third Aspect)

In accordance with a third aspect of the present invention, an example of user operation in the event uplink data for normal TTIs (unicast PUSCH) and uplink data for shortened TTIs (unicast sPUSCH) are scheduled simultaneously in predetermined subframes of the same carrier (or cell, CC, etc.) will be described below. In the following description, uplink data that is transmitted in units of normal TTIs will be referred to as "PUSCH," and uplink data that is transmitted in units of shortened TTIs will be referred to as "sPUSCH."

For user terminals having user capability for transmitting PUSCH and sPUSCH simultaneously in the same subframe (or in time division (TDM) transmission), and/or for user terminals which may or may not have this user capability, the radio base station schedules transmission of PUSCH and sPUSCH simultaneously. For example, when urgent data (for example, latency reduction traffic) is generated in a subframe where PUSCH is scheduled, the radio base station schedules transmission of sPUSCH in a predetermined shortened TTI included in the subframe.

Alternatively, sPUSCH may be transmitted in contention-based UL data transmission, in which a user terminal performs transmission without UL grants (sPDCCH) from a radio base station. In this case, as soon as urgent data (traffic) is generated, the user terminal can transmit sPUSCH, not based on a UL grant, even in an sTTI in the middle of a subframe.

In this case, the user terminal performs the transmission process (for example, transmission after the coding process) of both PUSCH and sPUSCH when a predetermined condition (condition Y) is fulfilled, and performs the transmission process for only one of them when condition Y is not fulfilled (first method). Alternatively, the user terminal always performs the transmission process for only one of PUSCH and sPUSCH based on a predetermined condition (second method). Alternatively, the user terminal autonomously decides whether to perform the transmission process for both PUSCH and sPUSCH, or to perform the transmission process for only one of them (third method).

<First Method>

In the first method, when PUSCH and sPUSCH are scheduled at the same time, the user terminal judges whether a predetermined condition (condition Y) is fulfilled. The user terminal can judge allocation of PUSCH and sPUSCH by performing the receiving process (for example, blind decoding) for PDCCH and sPDCCH. Alternatively, the sPUSCH may be transmitted in contention-based UL data transmission, and transmitted without a UL grant from the radio base station.

When condition Y is fulfilled, the user terminal performs the transmission process (simultaneous transmission) of PUSCH and sPUSCH in the same subframe. At this time, at least during the period in which PUSCH and sPUSCH overlap (for example, the sTTI period in which sPUSCH is transmitted), the user terminal may exert control so as to transmit sPUSCH alone by applying time division multiplexing (TDM) (see FIG. 10). When PUSCH and sPUSCH are transmitted in the same subframe, PUSCH and sPUSCH may be time-multiplexed and transmitted, so that single carrier characteristics of UL transmission can be maintained, and deterioration of communication quality can be reduced.

On the other hand, if condition Y is not fulfilled, the user terminal performs the transmission process for either PUSCH or sPUSCH, based on a predetermined rule.

As for the predetermined condition (condition Y), at least one of the resource allocation for PUSCH and sPUSCH, the type of PUSCH (or its use, the information carried, and so on), the type of PUCCH (or its use, the information carried, and so on), the transport block size (TBS) and/or the modulation and coding scheme (MCS) of PUSCH, and the total of the TBS of PUSCH and the TBS of sPUSCH can be used. Also, some or all of these conditions may be combined and configured.

For example, when sPUSCH and PUSCH and/or PUCCH are not scheduled in the same resource (for example, PRB), the user terminal judges that condition Y is fulfilled, and transmits PUSCH and sPUSCH in the same subframe, by using TDM.

Also, when SPS is applied to PUSCH, the user terminal judges that condition Y is fulfilled, and transmits PUSCH and sPUSCH in the same subframe, by using TDM. SPS refers to an operation in which the radio base station apparatus allocates PUSCH to the user terminal on a fixed basis, in a predetermined cycle, starting from the subframe (allocation starting time) in which uplink scheduling information is transmitted to the user terminal via PDCCH.

When SPS is applied to PUSCH, PUSCH and sPUSCH are transmitted simultaneously in the same subframe (for example, in TDM-based transmission), For example, even if the coding rate of SPS PUSCH is controlled sufficiently low, and TDM is executed upon transmission of sPUSCH, it is still possible to implement adaptive control so that both PUSCH and sPUSCH can be received properly.

Also, when PDCCH (and/or PUSCH) is used in random access procedures, the user terminal can judge that condition Y is not fulfilled and transmit PUSCH (that is, by dropping sPUSCH, instead of executing TDM in the same subframe). For example, if PDCCH transmitted in a normal TTI is a PDCCH to schedule message 3 in random access procedures, the user terminal transmits the PUSCH scheduled by this PDCCH, and in the time period to transmit this PUSCH, the user terminal drops the sPUSCH scheduled by the sPDCCH in the shortened TTI.

Random access procedures refers to the operation used when initial access is gained, synchronization is established, communication is resumed and so on, and is an important process for the user terminal, compared to normal UL data receipt. Therefore, when PDCCH (and/or PUSCH) is used in random access procedures, the user terminal judges that condition Y is not fulfilled, and transmits PUSCH preferentially, so that the rate at which random access procedures succeed can be increased.

Furthermore, the user terminal may judge that condition Y is fulfilled when the TBS of PUSCH (TBS$_{\_PUSCH}$) is equal to or less than a predetermined threshold (for example, a first threshold) and/or when the MCS of PUSCH (MCS$_{\_PUSCH}$) is equal to or less than a predetermined threshold (for example, a second threshold).

By transmitting PUSCH and sPUSCH (for example, in TDM transmission) in the same subframe based on the TBS of PUSCH (when TBS$_{\_PUSCH}$ is equal to or less than a predetermined threshold), the user terminal can control simultaneous (TDM) transmission of PUSCH and sPUSCH so as not to exceed the number of transmission bits to manage, control and store PUSCH (also referred to as "soft buffer size," etc.). Alternatively, by transmitting PUSCH and sPUSCH in the same subframe based on the MCS of PUSCH (when MCS$_{\_PUSCH}$ is equal to or less than a predetermined threshold), the user terminal can control simultaneous (TDM) transmission of PUSCH and sPUSCH so as not to exceed the number of transmission bits to manage, control and store PUSCH (also referred to as "soft buffer size," etc.).

Alternatively, the user terminal may judge that condition Y is fulfilled when the sum of the TBS of PUSCH (TBS$_{\_PUSCH}$) and the TBS of sPUSCH (TBS$_{\_sPUSCH}$) is less than or equal to a predetermined threshold (for example, a third threshold). In this way, by considering the TBS of sPUSCH in addition to the TBS of PUSCH, the user terminal can control simultaneous (TDM) transmission of PUSCH and sPUSCH so as not to exceed the number of transmission bits to manage, control and store both PUSCH and sPUSCH (also referred to as "soft buffer size," etc.).

Note that the user terminal can obtain parameters (scheduling information such as MCS and RB allocation) for determining whether condition Y is fulfilled from PDCCH and/or sPDCCH. That is, the user terminal performs the receiving process for PDCCH and sPDCCH in each subframe, and, when the user terminal judges that condition Y is fulfilled, the user terminal transmits (for example, performs TDM transmission of) PUSCH and sPUSCH in the same subframe. On the other hand, when the user terminal judges that condition Y is not fulfilled, the user terminal performs the transmission process for one of PUSCH and sPUSCH in the same subframe. Note that condition Y may be configured similarly to condition X described above.

Figure 10:
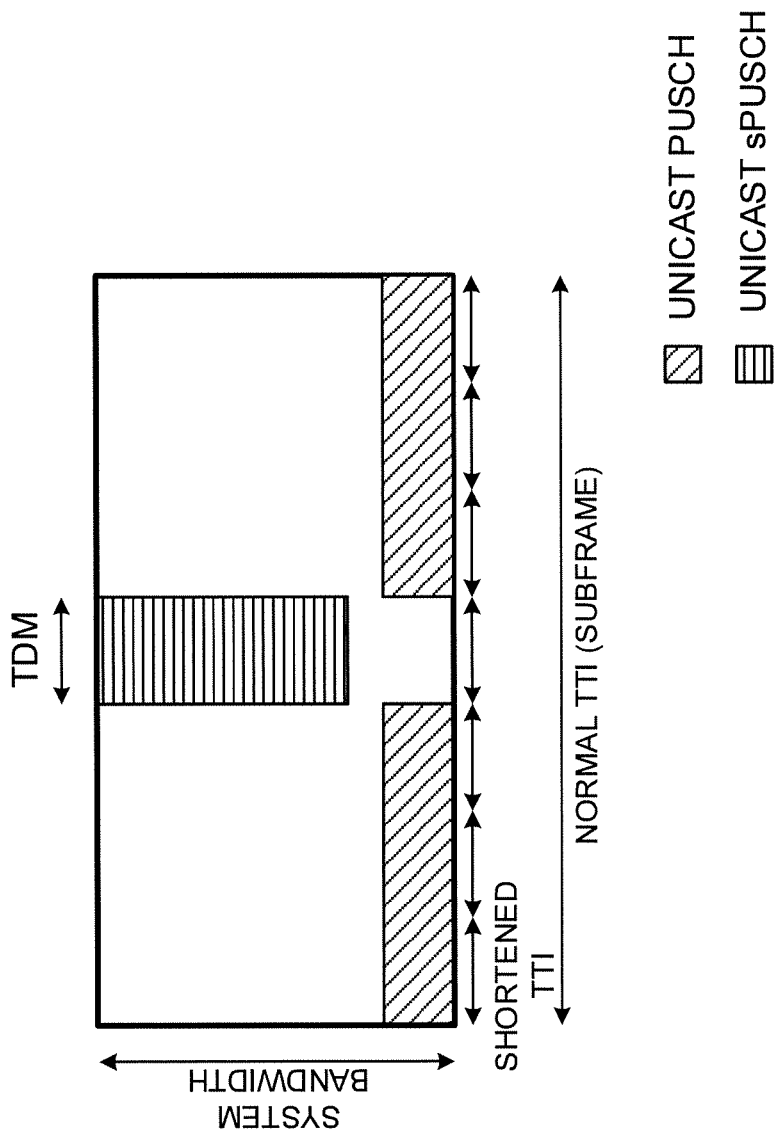
FIG. 10 is a diagram to show an example of allocation of PUSCH and sPUSCH.

Furthermore, when the user terminal transmits PUSCH and sPUSCH in the same subframe (for example, when condition X is fulfilled), it is preferable to configure the allocation field (allocation resource) of PUSCH and the allocation field of sPUSCH not to overlap each other (see FIG. 10).

Also, when PUSCH and sPUSCH are transmitted using TDM, PUSCH resource and sPUSCH resource may be configured to be multiplexed in the frequency domain. PUSCH and sPUSCH resources can be allocated in a flexible manner by allowing the radio base station to allocate PUSCH resource and PUSCH resource to overlap each other.

<Second Method>

According to a second method, when PUSCH and sPUSCH are scheduled at the same time, the user terminal performs the transmission process for either PUSCH or sPUSCH based on a predetermined rule. Note that the second method can also be applied to the operation of the user terminal when a predetermined condition (condition Y) is not fulfilled in the first method.

When PUSCH and sPUSCH are scheduled simultaneously in the same subframe, the user terminal can control so as not to perform (skip or interrupt) the transmission process for one of PUSCH and sPUSCH (for example, PUSCH) at all times.

Since uplink data allocated in shortened TTIs (sPUSCH) is often data that demands reduced latency, by prioritizing the transmission process for sPUSCH, it is possible to reduce the latency required by the system. Also, when the user terminal transmits only one of PUSCH and sPUSCH in the same subframe, the resource for PUSCH and the resource for sPUSCH may be configured to overlap each other. This allows the radio base station to configure resource allocation for PUSCH and sPUSCH in a flexible way.

Alternatively, the user terminal may prioritize receipt of PUSCH over sPUSCH depending on the type (or use, the information carried, etc.) of PUSCH and/or PDCCH. For example, when PUSCH (and/or PDCCH) is used in random access procedures, the user terminal exerts control so that PUSCH is encoded and transmitted, and sPUSCH is not transmitted (skipped or suspended).

In this way, by controlling the transmission process for either one of PUSCH and sPUSCH based on the type (or use) of signals and so on, deterioration of communication quality can be reduced. Also, by adopting a configuration in which PUSCH resources and sPUSCH resources can be configured to overlap each other, PUSCH and sPUSCH resources can be allocated in a flexible manner.

<Third Method>

According to a third method, when PUSCH and sPUSCH are scheduled at the same time, the user terminal autonomously decides whether to perform the transmission process for both PUSCH and sPUSCH in the same subframe, or perform the transmission process only for one of them. That is, the user terminal side may decide to transmit PUSCH and sPUSCH in the same subframe (for example, in TDM transmission), or to perform the transmission process for either PUSCH or sPUSCH.

When the user terminal autonomously decides the method of receiving PUSCH and sPUSCH, the radio base station cannot know how the user terminal has reached this decision. In other words, the radio base station and the user terminal are in a state in which they do not share a common understanding of the method of receiving PUSCH and sPUSCH.

In this case, the radio base station can identify the receiving method that has been selected by the user terminal based on PUSCH and sPUSCH transmitted from the user terminal.

(Fourth Aspect)

In accordance with a fourth aspect of the present invention, decoding control (for example, the number of times of decoding) for PDCCH and sPDCCH which the user terminal detects (by, for example, blind decoding) in one subframe will be described.

As described above, when the user terminal decides to receive PDSCH and sPDSCH (or to transmit PUSCH and sPUSCH) in the same subframe, the user terminal detects PDCCH and sPDCCH. In this case, how to have control over the detection process (for example, blind decoding), which the user terminal performs with respect to PDCCH and sPDCCH, is the problem.

Therefore, according to the fourth aspect, the user terminal reports user capability information as to the number of times of blind decoding is performed, to the radio base station, and the radio base station controls allocation of PDCCH and sPDCCH based on this user capability information. This user capability information may relate to the number of times blind decoding is performed per user terminal or per component carrier, which the user terminal uses when communicating. Alternatively, the number of times of decoding is allowed in the user terminal (for example, the upper limit value for each subframe and/or sTTI, the number of times in each subframe and/or each sTTI, etc.) may be configured in advance, and the radio base station may control the allocation of PDCCH and sPDCCH based on preconfigured values.

For example, the user terminal reports user capability information as to the number of times decoding can be performed in each subframe (the total of the numbers of times of decoding for PDCCH and sPDCCH) to the radio base station. Based on this user capability information, the radio base station controls allocation of PDCCH and/or sPDCCH so that the number of times PDCCH and sPDCCH are decoded in a subframe does not exceed the user capability.

In this case, depending on the configuration of sPDCCH (for example, the number of times PDCCH is decoded), the number of times to decode PDCCH in one subframe may be configured smaller than the value (for example, 32 or 48 times) specified in existing systems. For example, the number of times the user terminal performs decoding in one subframe is configured to a value not exceeding the maximum value in existing systems. By this means, an increase in the load of the user terminal can be reduced.

Alternatively, the user terminal may report the number of times sPDCCH can be decoded in one subframe, to the radio base station, as user capability information. Based on this user capability information, the radio base station controls allocation of sPDCCH so that the number of times to decode each sPDCCH does not exceed the user capability.

In this case, regardless of the configuration of sPDCCH (for example, the number of times to decode sPDCCH), the number of times to decode PDCCH in one subframe can be configured to the same value (for example, 32 or 48 times) as specified in existing systems. In this way, by controlling decoding of PDCCH in the same way as before, and by configuring the number of times of decoding additionally when a new sPDCCH is added, it is possible to flexibly control the allocation of downlink control information.

FIG. 11 shows an example of a method for configuring the number of times of blind decoding of PDCCH and sPDCCH. FIG. 11 assumes a case where the maximum number of times to decode PDCCH and sPDCCH (user terminal capability) in UE-specific search spaces in each subframe is 48 times. The radio base station adjusts the configurations of PDCCH and sPDCCH so that the total number of times to decode PDCCH and sPDCCH in UE-specific search spaces in each subframe does not exceed 48.

Figure 11A:
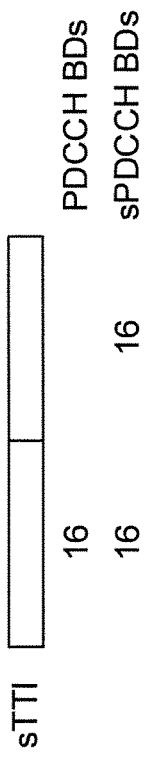
FIGS. 11A to 11F are diagrams to show examples of blind decoding methods for PDCCH and sPDCCH.
Figure 11B:
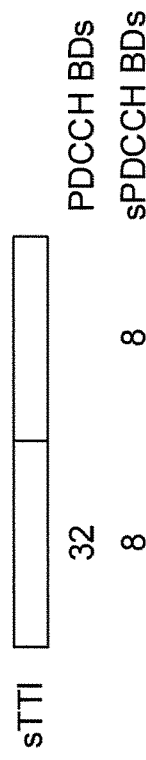
Figure 11C:
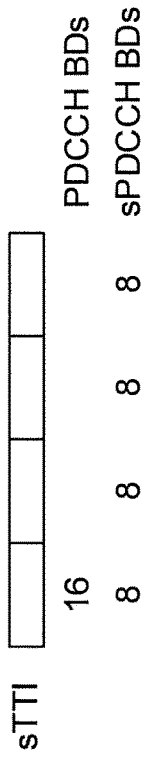
Figure 11D:
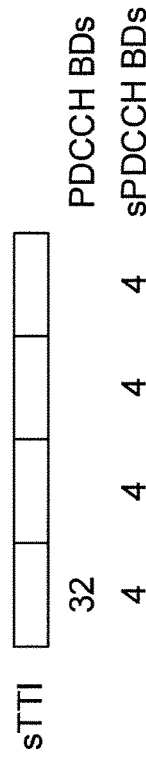
Figure 11E:
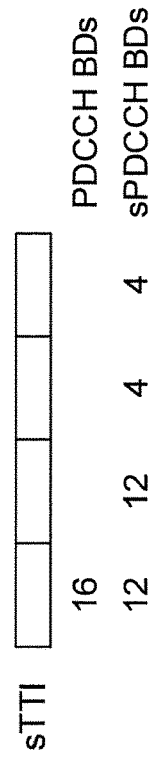
Figure 11F:
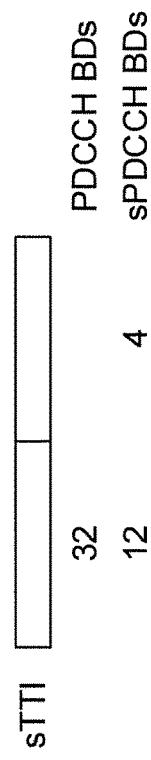

FIGS. 11A, 11C and 11D show cases where one subframe contains four TTIs, and FIGS. 11B, 11D and 11E show cases where one subframe contains two TTIs. As shown in FIG. 11A, the number of times to decode each sPDCCH can be configured smaller than the number of times to decode PDCCH. Alternatively, as shown in FIG. 11B, the number of times to decode each sPDCCH and the number of times to decode PDCCH may be configured equal.

Alternatively, as shown in FIGS. 11C and 11D, the number of times of decoding for PDCCH may be made equal to the number of times of decoding used heretofore (for example, 32), and the number of remaining decoding may be allocated to each sPDCCH. In FIG. 11A to 11D, cases where the number of times of decoding each sPDCCH are equal are shown, but these are not limiting. The number of times to decode sPDCCH in each sTTI included in the same subframe may be configured differently. For example, the number of times to decode sPDCCH in an sTTI that is transmitted early in a subframe (an sTTI that is located early on the time axis) may be configured relatively large (see FIGS. 11E and 11F). This can reduce the amount of processing required by sTTIs to be transmitted later (sTTIs located later on the time axis), which require high-speed processing, and can reduce the burden on the user terminal.

In this way, by controlling the number of times to decode PDCCH and sPDCCH, the user terminal can appropriately decode PDCCH and sPDCCH.

(Radio Communication System)

Now, the structure of a radio communication system according to an embodiment of the present invention will be described below. In this radio communication system, each radio communication method according to the above-described embodiments is employed. Note that the radio communication method according to each embodiment may be used alone or may be used in combination.

Figure 12:
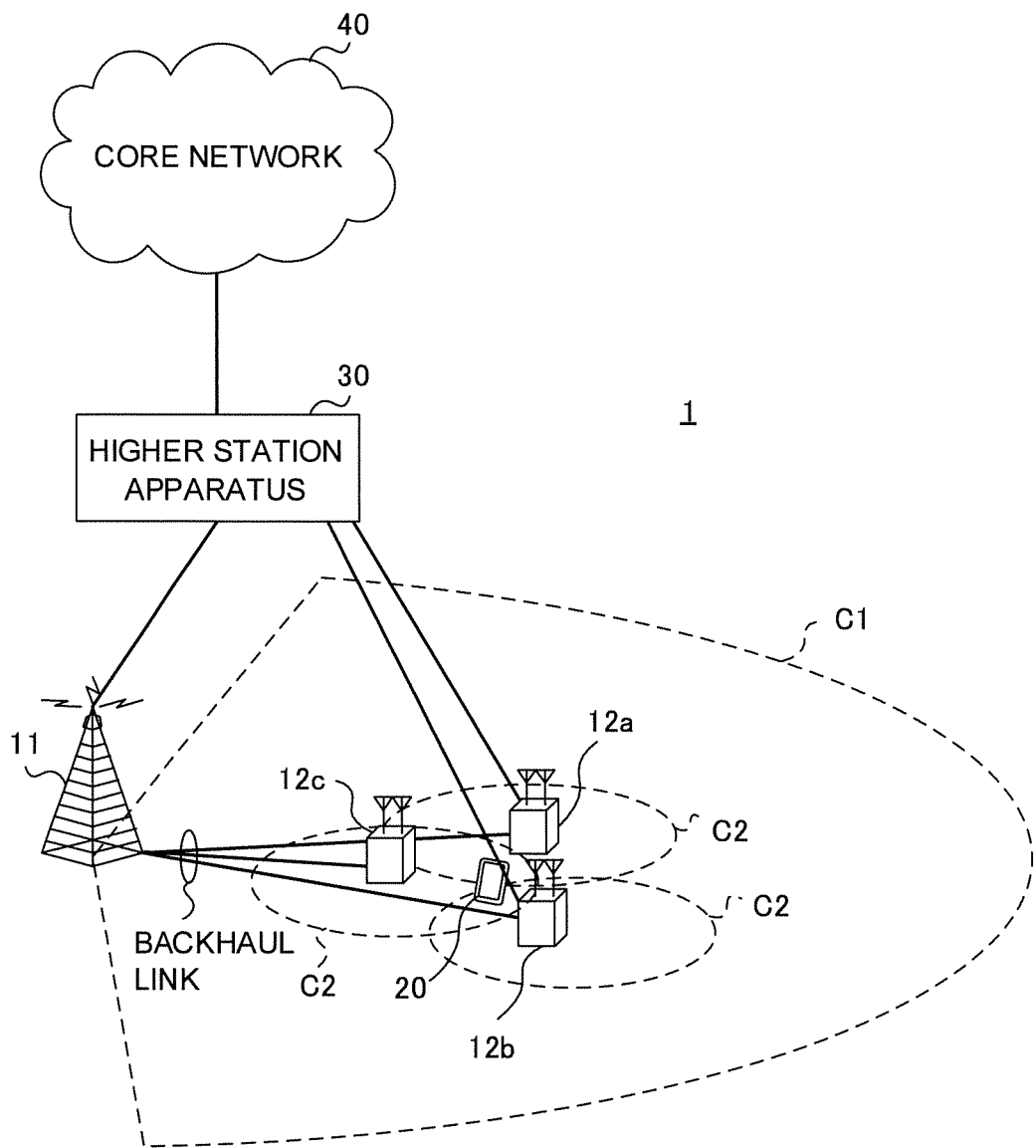
FIG. 12 is a schematic configuration diagram to show an example of a schematic structure of a radio communication system according to an embodiment of the present invention.

FIG. 12 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 12 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2 at the same time by means of CA or DC. Also, the user terminals 20 can execute CA or DC by using a plurality of cells (CCs) (for example, two or more CCs). Furthermore, the user terminals can use license band CCs and unlicensed band CCs as a plurality of cells. Note that it is possible to adopt a configuration including a TDD carrier, in which shortened TTIs are used to some of a plurality of cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, DL data channel (PDSCH (Physical Downlink Shared CHannel), which is also referred to as, for example, a "DL shared channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Block) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement information (ACK/NACK) in response to the PUSCH is communicated by the PHICH. The EPDCCH is frequency-division-multiplexed with the PDSCH (downlink shared data channel) and used to communicate DCI and so on, like the PDCCH.

In the radio communication system 1, UL data channel (PUSCH (Physical Uplink Shared CHannel), which is also referred to as "UL shared channel" and so on), which is used by each user terminal 20 on a shared basis, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI (Uplink Control Information)), including at least one of delivery acknowledgment information (ACK/NACK) and radio quality information (CQI), is transmitted by the PUSCH or the PUCCH. By means of the PRACH, random access preambles for establishing connections with cells are communicated.

<Radio Base Station>

Figure 13:
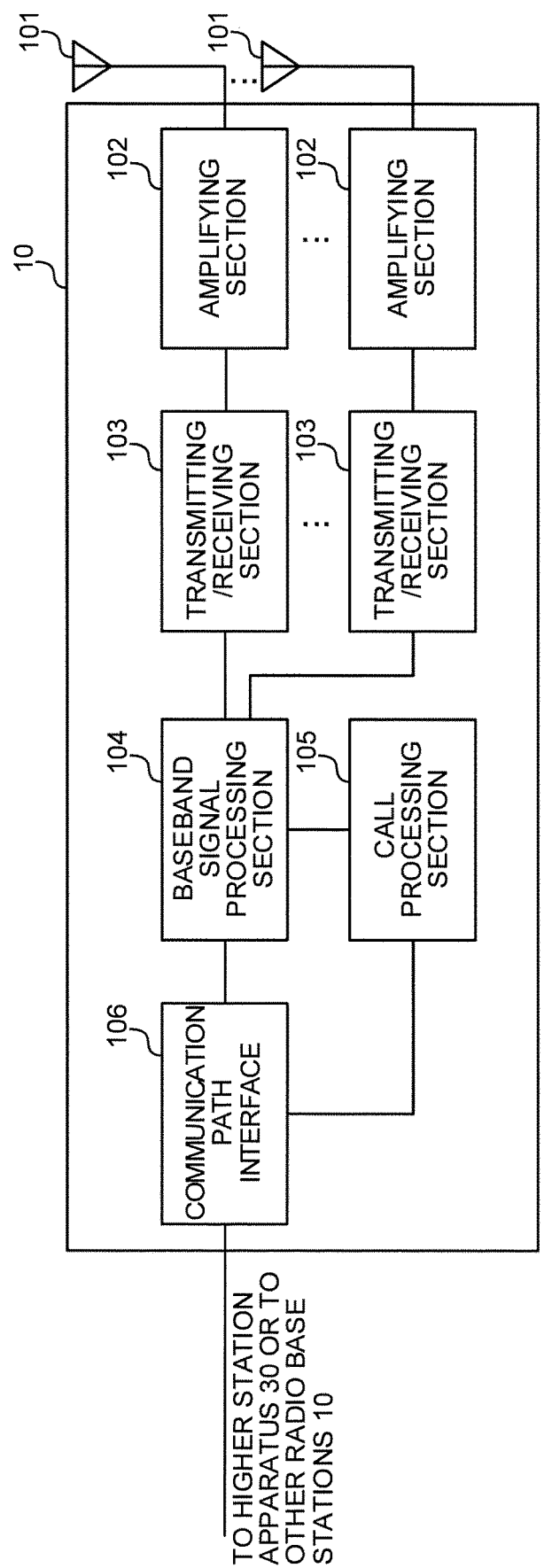
FIG. 13 is a diagram to show an example of an overall structure of a radio base station according to the present embodiment.

FIG. 13 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, DL control signals (DL control channels), DL data signals (DL data channels, DL shared channels and so on), DL reference signals (DM-RS, CSI-RS and so on), discovery signals, synchronization signals, broadcast signals and so on), and receive UL signals (for example, UL control signals (UL control channels), UL data signals (UL data channels, UL shared channels and so on), UL reference signals and so on).

To be more specific, the transmitting/receiving sections 103 transmit first downlink control information (PDCCH), which is transmitted per first TTI, and second downlink control information (sPDCCH), which is transmitted in a second TTI. Also, the transmitting/receiving sections 103 also transmit first downlink data (PDSCH), which is scheduled by first downlink control information (PDCCH), and second downlink data (sPDSCH), which is scheduled by second downlink control information (sPDCCH), in the same carrier and/or the same subframe.

The transmitting/receiving sections 103 receive user capability information as to whether or not simultaneous receipt of PDSCH and sPDSCH in the same carrier is possible. Alternatively, the transmitting/receiving sections 103 receive user capability information as to the number of times decoding can be performed to detect PDCCH and/or sPDCCH (for example, the number of times of blind decoding). In addition, the transmitting/receiving sections 103 receive first uplink data (PUSCH) and second uplink data (sPUSCH) simultaneously in the same carrier and/or the same subframe.

The transmission section and the receiving section of the present invention are comprised of a transmitting/receiving section 103 and/or a communication path interface 106.

Figure 14:
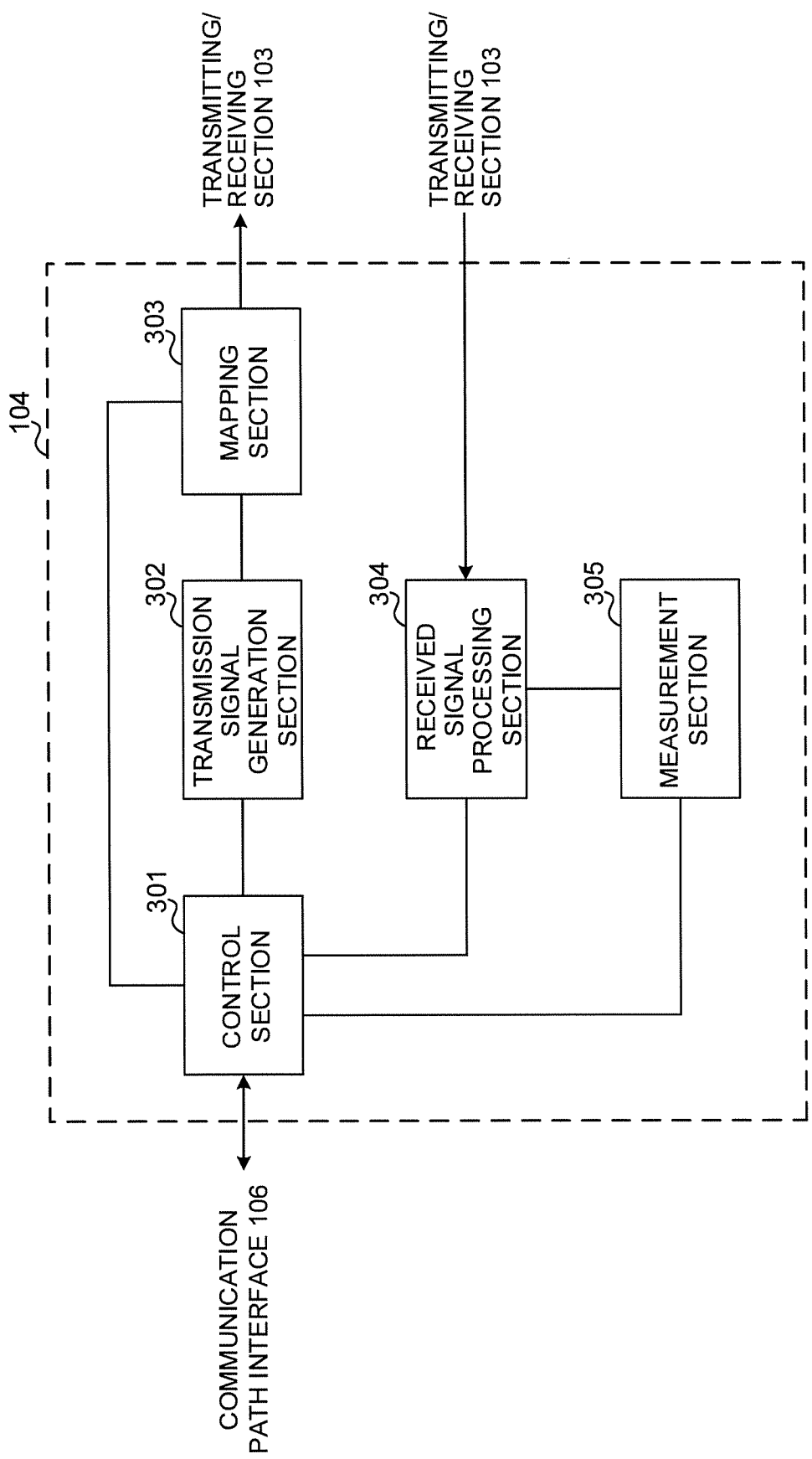
FIG. 14 is a diagram to show an example of a functional structure of a radio base station according to the present embodiment.

FIG. 14 is a diagram to show an example of a functional structure of a radio base station according to the present embodiment. Note that, although FIG. 14 primarily shows functional blocks that pertain to characteristic parts of the present embodiment, the radio base station 10 has other functional blocks that are necessary for radio communication as well. As shown in FIG. 14, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls generation of signals in the transmission signal generation section 302, allocation of signals by the mapping section 303, and so on. Furthermore, the control section 301 controls the signal receiving processes in the received signal processing section 304, the measurements of signals in the measurement section 305, and so on.

The control section 301 controls scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

In addition, the control section 301 controls simultaneous transmission of first downlink data (PDSCH), which is based on first downlink control information (PDCCH), and second downlink data (sPDSCH), which is based on second downlink control information (sPDCCH) in the same carrier (see FIG. 6). In this case, when the user terminal can receive PDSCH and sPDSCH simultaneously, the control section 301 controls allocation so that PDSCH resources and sPDSCH resources do not overlap each other (see FIG. 6A). On the other hand, when the user terminal receives only one of PDSCH and sPDSCH, the control section 301 may control allocation so that PDSCH resources and sPDSCH resources overlap each other (see FIG. 7B).

Also, if the user terminal autonomously decides to receive PDSCH and sPDSCH, the control section 301 can decide the receiving method for use by the user terminal based on HARQ-ACK in response to these PDSCH and sPDSCH (see FIG. 8B).

The transmission signal generation section 302 generates DL signals (DL control channels, DL data channels, DL reference signals such as DM-RSs, and so on) based on commands from the control section 301 and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (UL control channels, UL data channels, UL reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, the received signal processing section 304 outputs at least one of a preamble, control information and UL data to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

<User Terminal>

Figure 15:
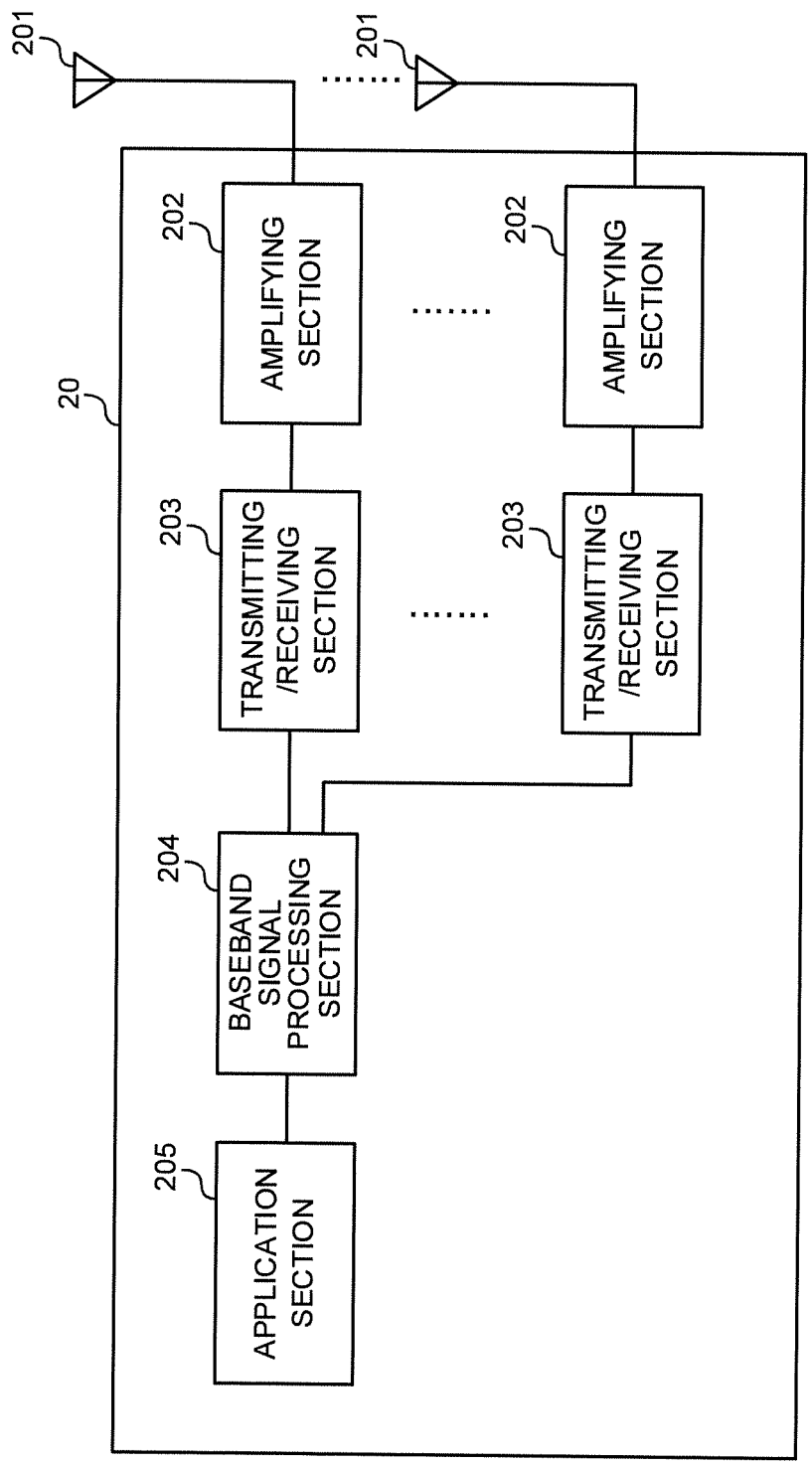
FIG. 15 is a diagram to show an example of an overall structure of a user terminal according to the present embodiment.

FIG. 15 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, in the DL data, the system information and the higher layer control information are also forwarded to the application section 205.

Meanwhile, the UL data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals (for example, DL control signals (DL control channels), DL data signals (DL data channels, DL shared channels and so on), DL reference signals (DM-RS, CSI-RS and so on), discovery signals, synchronization signals, broadcast signals and so on), and transmit UL signals (for example, UL control signals (UL control channels), UL data signals (UL data channels, UL shared channels and so on), UL reference signals and so on).

To be more specific, the transmitting/receiving sections 203 receive first downlink control information (PDCCH), which is transmitted per first TTI, and second downlink control information (sPDCCH), which is transmitted in a second TTI. Also, the transmitting/receiving sections 203 receive first downlink data (PDSCH), which is scheduled by first downlink control information (PDCCH), and second downlink data (sPDSCH), which is scheduled by second downlink control information (sPDCCH), in the same carrier and/or in the same subframe.

Also, the transmitting/receiving sections 203 transmit user capability information as to whether or not simultaneous receipt of PDSCH and sPDSCH in the same carrier is possible. Alternatively, the transmitting/receiving sections 203 transmit user capability information as to the number of times decoding can be performed to detect PDCCH and/or sPDCCH (for example, the number of times of blind decoding). In addition, the transmitting/receiving sections 203 can transmit first uplink data (PUSCH) and second uplink data (sPUSCH) simultaneously in the same carrier and/or the same subframe.

Figure 16:
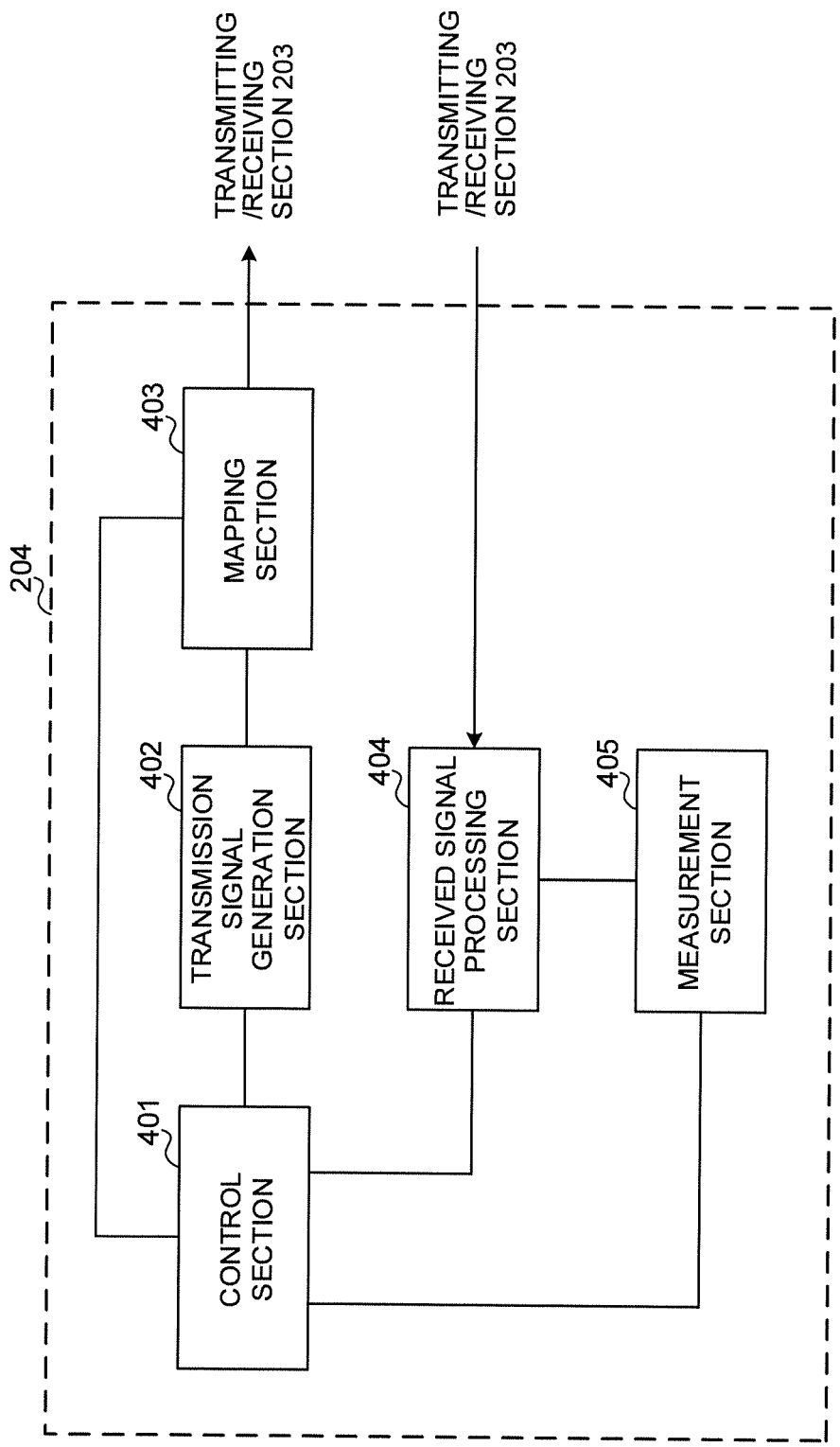
FIG. 16 is a diagram to show an example of a functional structure of a user terminal according to the present embodiment.

FIG. 16 is a diagram to show an example of a functional structure of a user terminal according to the present embodiment. Note that, although FIG. 16 primarily shows functional blocks that pertain to characteristic parts of the present embodiment, the user terminal 20 has other functional blocks that are necessary for radio communication as well. As shown in FIG. 16, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, allocation of signals by the mapping section 403, and so on. Furthermore, the control section 401 controls the signal receiving processes in the received signal processing section 404, the measurements of signals in the measurement section 405, and so on.

The control section 401 acquires a DL control channel and a DL data channel transmitted from the radio base station 10 from the received signal processing section 404. To be more specific, the control section 401 controls the transmitting/receiving sections 203 and the received signal processing section 404 to blind-decode the DL control channel to detect DCI and/or sDCI, and receive the DL data channel based on the DCI and/or sDCI. In addition, the control section 401 estimates channel gain based on DL reference signals and demodulates the DL data channel based on the estimated channel gain.

The control section 401 may control transmission of retransmission control information (for example, HARQ-ACK, etc.) transmitted in a UL control channel or a UL data channel, based on the result of deciding whether or not retransmission control is necessary for the DL data channel, and so on. Furthermore, the control section 401 may control transmission of channel state information (CSI), which is generated based on DL reference signals.

In addition, the control section 401 controls simultaneous receipt of first downlink data (PDSCH), which is based on first downlink control information (PDCCH), and second downlink data (sPDSCH), which is based on second downlink control information (sPDCCH), in the same carrier, based on predetermined conditions (see FIG. 5 and FIG. 6). Also, the predetermined conditions may be at least one of the type of PDSCH, the type of PDCCH, the TBS of PDSCH and/or sPDSCH, and the MCS of PDSCH and/or sPDSCH.

Also, the control section 401 can control simultaneous transmission of first uplink data (PUSCH) in the first TTI, and second uplink data (sPUSCH), in the same carrier, based on predetermined conditions (see FIG. 10).

In addition, the control section 401 exerts control so that capability information as to whether or not simultaneous receipt of PDSCH and sPDSCH in the same carrier is possible is reported to the radio base station. Alternatively, the control section 401 exerts control so that capability information as to the number of times decoding can be performed to detect PDCCH and/or sPDCCH is reported to the radio base station.

Also, when PDSCH and sPDSCH are scheduled at the same time, the control section 401 can perform the receiving process for one of PDSCH and sPDSCH based on a predetermined rule (see FIG. 7A). Alternatively, when PDSCH and sPDSCH are scheduled at the same time, the control section 401 can exert control so that whether the receiving process is performed for both of PDSCH and sPDSCH, or performed for only one of these, can be determined autonomously on the user terminal side (see FIG. 8A).

The transmission signal generation section 402 generates UL signals (UL control channels, UL data signals, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates the UL data channel based on commands from the control section 401. For example, when a UL grant is included in a DL control channel that is reported from the radio base station 10, the control section 401 commands the transmission signal generation section 402 to generate the UL data channel.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signal include, for example, DL signals transmitted from the radio base station 10 (DL control channels, DL data channels, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of the DL control channel, which schedules transmission and/or receipt of the DL data channel, and performs the receiving process of the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the DL received quality (for example, RSRQ), channel states and so on of the received signals. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 17:
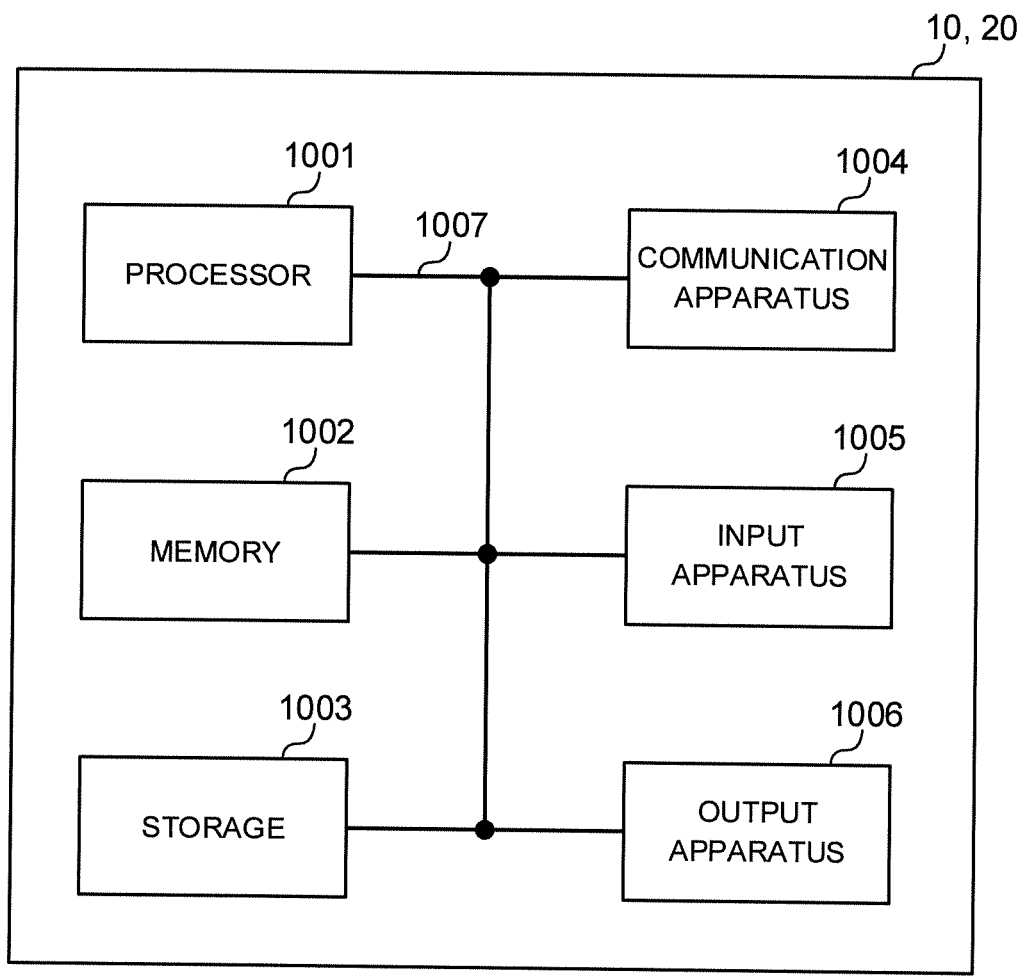
FIG. 17 is a diagram to show an example hardware structure of a radio base station and a user terminal according to an embodiment of the present invention.

For example, the radio base station, user terminals and so on according to embodiments of the present invention may function as a computer that executes the processes of the radio communication method of the present invention. FIG. 17 is a diagram to show an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. TTIs may be transmission time units for channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-094882, filed on May 10, 2016, including the specification, drawings and abstract, is incorporated herein by reference in its entirety.

The invention claimed is:

1. A terminal comprising:
a receiver that decodes a downlink control channel per a given time duration; and
a processor that controls decoding of the downlink control channel based on a number of times of decoding a downlink control channel configured per the given time duration,
wherein a maximum number of times of decoding a first downlink control channel to which a given subcarrier spacing is applied is greater than a maximum number of times of decoding a second downlink control channel to which a broader subcarrier spacing than the given subcarrier spacing is applied,
wherein the processor reports, to a radio base station, user capability information regarding the number of times of decoding for use in allocating the downlink control channel, and
wherein the given subcarrier spacing corresponds to a cyclic prefix (CP) that is configured by higher layer signaling.

2. A radio communication method for a terminal, comprising:
decoding a downlink control channel per a given time duration; and
controlling decoding of the downlink control channel based on a number of times of decoding a downlink control channel configured per the given time duration,
wherein a maximum number of times of decoding a first downlink control channel to which a given subcarrier spacing is applied is greater than a maximum number of times of decoding a second downlink control channel to which a broader subcarrier spacing than the given subcarrier spacing is applied, wherein the terminal reports, to a radio base station, user capability information regarding the number of times of decoding for use in allocating the downlink control channel, and wherein the given subcarrier spacing corresponds to a cyclic prefix (CP) that is configured by higher layer signaling.

* * * * *